United States Patent [19]

Fujimoto et al.

[11] Patent Number: 5,704,316
[45] Date of Patent: Jan. 6, 1998

[54] VALVE DRIVE SYSTEM OF AN INTERNAL COMBUSTION ENGINE

[75] Inventors: Akihiro Fujimoto; Shinichi Murata; Jun Isomoto; Noriyuki Miyamura; Hirofumi Higashi, all of Tokyo, Japan

[73] Assignee: Mitsubishi Jidosha Kogyo Kabushiki Kaisha, Tokyo, Japan

[21] Appl. No.: 433,518

[22] PCT Filed: Sep. 20, 1994

[86] PCT No.: PCT/JP94/01548

§ 371 Date: May 12, 1995

§ 102(e) Date: May 12, 1995

[87] PCT Pub. No.: WO95/08701

PCT Pub. Date: Mar. 30, 1995

[30] Foreign Application Priority Data

| Sep. 20, 1993 | [JP] | Japan | 5-233113 |
| Oct. 21, 1993 | [JP] | Japan | 5-263437 |
| Oct. 21, 1993 | [JP] | Japan | 5-263438 |

[51] Int. Cl.$^6$ ............................ F01L 13/00; F01L 31/00
[52] U.S. Cl. ............................ 123/90.17; 123/90.31
[58] Field of Search ............... 123/90.12, 90.15, 123/90.16, 90.17, 90.18, 90.31, 90.6; 74/567, 568 R

[56] References Cited

U.S. PATENT DOCUMENTS

| 5,105,679 | 4/1992 | Voigt | 123/90.17 |
| 5,168,772 | 12/1992 | Adamis et al. | 123/90.17 |
| 5,219,313 | 6/1993 | Danieli | 123/90.17 |
| 5,239,885 | 8/1993 | Voigt | 123/90.17 |
| 5,333,579 | 8/1994 | Hara et al. | 123/90.31 |
| 5,417,186 | 5/1995 | Elrod et al. | 123/90.31 |

FOREIGN PATENT DOCUMENTS

| 3234640 | 3/1984 | Germany. |
| 57-92004 | 11/1982 | Japan. |
| 59-54713 | 3/1984 | Japan. |
| 59-110816 | 6/1984 | Japan. |
| 62-195608 | 12/1987 | Japan. |
| 64-49610 | 3/1989 | Japan. |
| 62-165518 | 7/1989 | Japan. |
| 1-30569 | 9/1989 | Japan. |
| 2-13145 | 1/1990 | Japan. |
| 2209061 | 4/1989 | United Kingdom. |

*Primary Examiner*—Weilun Lo

[57] ABSTRACT

A valve drive system of an internal combustion engine provided with a camshaft (20) adapted to be rotated by means of a crankshaft, a cam robe (38) rotatably mounted on the camshaft (20), a cam (24) formed integrally with the cam robe (38) and serving to open and close an intake valve (24) in cooperation with a valve spring (92), a viscous coupling (40) arranged between the camshaft (20) and the cam robe (38) and serving to transmit a rotatory force of the camshaft (20) to the cam robe (38), and a spiral spring (42) for connecting the camshaft (20) and the cam robe (38) and urging the cam robe (38) toward a predetermined rotational angle position with respect to the camshaft (20).

14 Claims, 21 Drawing Sheets

VALVE DRIVE SYSTEM OF AN INTERNAL COMBUSTION ENGINE

TECHNICAL FIELD

The present invention relates to a valve drive system for opening and closing an intake valve or an exhaust valve of an internal combustion engine, and more particularly, to a valve drive system having therein a mechanism for varying a valve timing.

BACKGROUND ART

Valve drive systems having a variable valve timing mechanism therein are disclosed in, for example, Jpn. Pat. Appln. KOKAI Publication Nos. 59-54713 and 59-110816. These conventional systems comprise a cam rotatably mounted on a camshaft; and a connecting device for connecting the camshaft and the cam and adjusting a rotational phase of the cam with respect to the camshaft. This connecting device includes a pressure chamber for hydraulically connecting the camshaft and the cam, and a hydraulic circuit for adjusting a hydraulic pressure in the pressure chamber in accordance with the operation state of an internal combustion engine, and the rotational phase of the cam with respect to the camshaft is adjusted by means of the pressure in the pressure chamber.

In the case of the connecting device described above, accurate control of the rotational phase of the cam with respect to the camshaft, that is, valve timing, entails fine control of the pressure in the pressure chamber by means of a solenoid-controlled valve in the hydraulic circuit. Moreover, the hydraulic circuit requires use of a hydraulic pump, as a hydraulic pressure source, for generating a high hydraulic pressure, and oil leakage from the hydraulic circuit must be prevented securely. Consequently, components of the connecting device require high-accuracy machining, and the number of components of the connecting device increases.

The object of the present invention is to provide a valve drive system of a simple construction, capable of varying a timing for opening or closing a valve without requiring an electronic control, and improving the output of an internal combustion engine throughout an operational region of the internal combustion engine.

SUMMARY OF THE INVENTION

The above object is achieved by a valve drive system of the present invention. The valve drive system of the present invention comprises, a first rotating member adapted to be rotated in association with a crankshaft of an internal combustion engine, a second rotating member rotatably provided with respect to the first rotating member, a cam provided for the second rotating member and adapted to cooperate with one valve of intake and exhaust valves, and connecting means for connecting the first rotating member and the second rotating member to allow the first and second rotating members to relatively rotate each other. This connecting means has a transmission function to transmit the rotatory force of the first rotating member to the second rotating member, thereby causing the cam to rotate together with the second rotating member. The connecting means also has a variable function to restrict an increase of the rotating speed of the second rotating member based on the restoring force of a valve spring of the valve in accordance with the operation state of the internal combustion engine, in a process of reducing the cam lift as the cam rotates, and settle the time of termination of the cam lift with respect to the rotational phase of the crankshaft.

According to the valve drive system, as described above, the speed of rotation of the second rotating member relative to the first rotating member is increased by means of the valve spring in the process of reducing the cam lift. However, this increase of the speed of rotation is restricted by the variable function of the connecting means depending on the operation state of the internal combustion engine, whereby the time of termination of the cam lift, that is, valve closing timing, is controlled.

The transmission and variable functions of the connecting means can be effectuated by means of a fluid coupling which connects the first and second rotating members.

If the second rotating member has a hollow shape, the relative rotation of the first and second rotating members can be allowed by only rotatably mounting the second rotating member on the first rotating member.

In the case where the valve drive system of the present invention is applied to a multicylinder engine, the system can comprise a first rotating member common to the individual cylinders, and second rotating members provided individually for the cylinders.

The connecting means of the valve drive system of the present invention can further include a pusher portion provided for the first rotating member, and a receiving portion provided for the second rotating member and adapted to engage the pusher portion in the process of increasing the cam lift. Preferably, in this case, the connecting means should be provided with urging means for the first and second rotating members, and this urging means urges the first and second rotating members so that the pusher portion abuts against the receiving portion.

The connecting means, which is provided with the pusher portion and the receiving portion, as described above, causes the first and second rotating members to rotate integrally with each other in the process of increasing the cam lift, so that the valve opening timing is settled in accordance with a profile of the cam.

A viscous coupling can be used as the fluid coupling of the connecting means. The viscous coupling includes a fluid chamber defined between the first and second rotating members and having a viscous fluid sealed therein, a first plate located in the fluid chamber and fixed to the first rotating member, and a second plate located opposite the first plate in the fluid chamber and fixed to the second rotating member.

Since the bonding force between the first and second plates varies depending on the rotating speed of the first rotating member, the aforesaid viscous coupling can simultaneously fulfill the aforementioned transmission function and variable function of the connecting means, and can control the valve opening timing and valve closing timing without using an electronic control.

If the second rotating member includes a first portion fitted on the first rotating member from the outside and a second portion having a diameter larger than that of the first portion, this second portion can be used as part of a casing which defines the aforesaid fluid chamber of the viscous coupling. Preferably, in this case, the second rotating member should have the second portion at one end portion thereof and the aforesaid receiving portion at the other end portion thereof.

The fluid coupling of the connecting means is not limited to the viscous coupling, as described above, and may alternatively be formed of a fluid coupling. The fluid coupling includes a chamber defined between the first and second rotating members and having a noncompressive fluid sealed therein, a wall member attached to the first rotating member and dividing the chamber into first and second fluid chambers in the rotating direction of the first and second rotating members, and a communication channel connecting the first and second fluid chambers. Preferably, the fluid coupling further includes adjusting means for changing the flow resistance of the communication channel.

According to this fluid coupling, the aforementioned transmission function and variable function are fulfilled as the characteristic of the delivery of the noncompressive fluid between the first and second fluid chambers varies depending on the rotating speed of the first rotating member, and the valve opening timing and valve closing timing can be controlled in accordance with the operation state of the internal combustion engine without using electronic control.

The fluid coupling of the connecting means is expected to fulfill its transmission function only in the process of increasing the cam lift.

The connecting means can further include urging means for urging the second rotating member toward the first rotating member. The urging means settles the rotational angle position of the second rotating member with respect to the first rotating member when the first rotating member and second rotating member rotate integrally with each other. In this case, the second rotating member can relatively rotate with respect to the first rotating member while resisting the urging force of the urging means.

Moreover, the connecting means can further include limiting means for limiting an allowable range of relative rotation between the first and second rotating members.

The connecting means may be provided with a second fluid coupling of a type different from that of the aforesaid first fluid coupling. The second fluid coupling includes a wall member attached to the first rotating member and having a front face situated on the front side with respect to the rotating direction of the first rotating member, a fluid chamber defined between the front face of the wall member and the second rotating member, and control means for controlling the supply to and discharge of a noncompressive fluid from the fluid chamber. In this case, the control means can include means for limiting the speed of discharge of the noncompressive fluid from the fluid chamber. The second fluid coupling fulfills the same function as the first fluid coupling.

BEST MODE OF CARRYING OUT THE INVENTION

Figure 1:
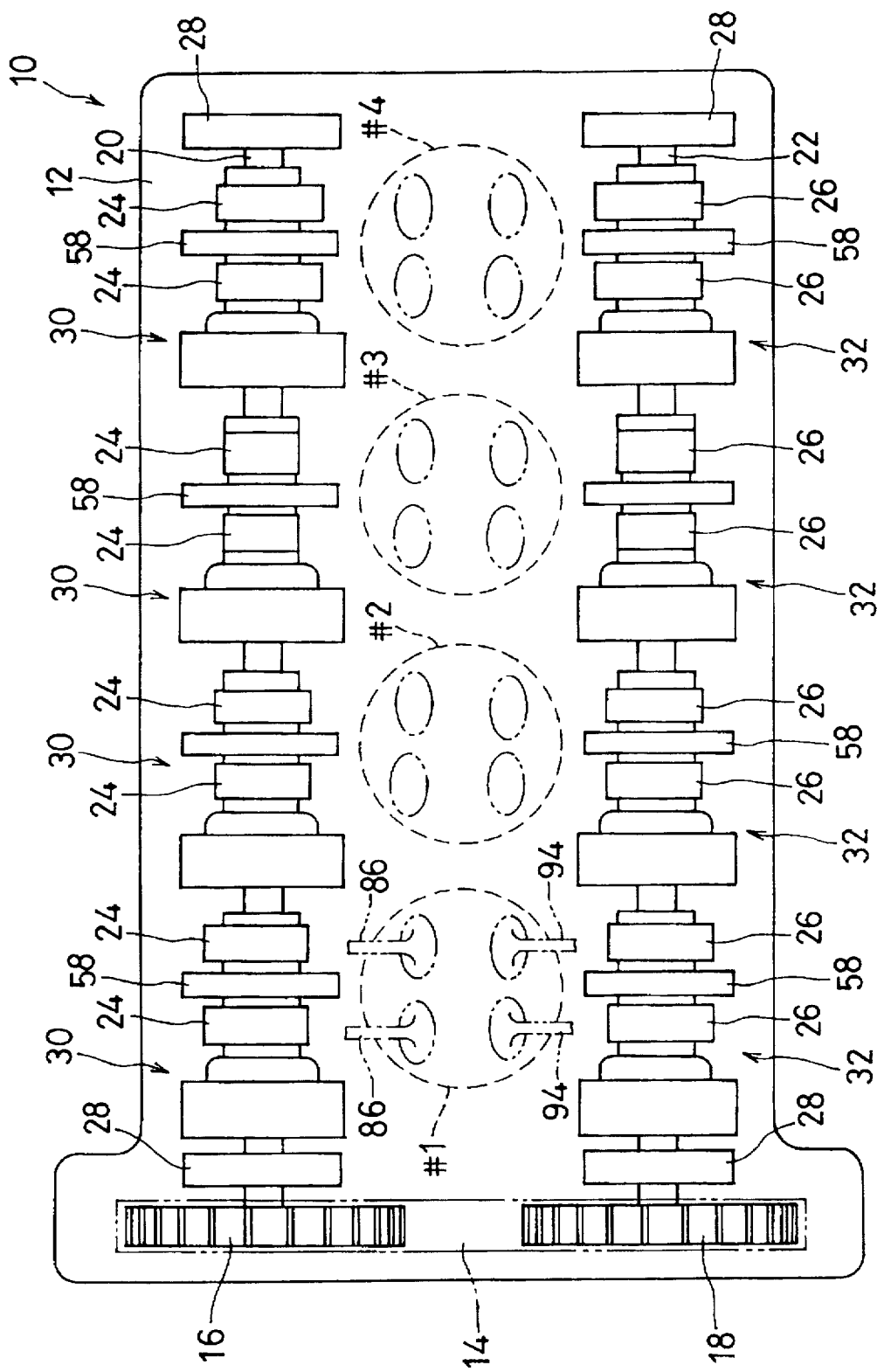
FIG. 1 is a plan view showing a valve drive system according to a first embodiment applied to an internal combustion engine.

Referring to FIG. 1, there is shown a four-cylinder gasoline engine (hereinafter referred to simply as "engine") 10.

Each cylinder of the engine 10 is furnished with four valves. A cylinder head 12 of the engine 10 is mounted on a cylinder block (not shown), and this cylinder block is provided with a crankshaft (not shown). The rotatory force of the crankshaft is transmitted to timing gears 16 and 18 by means of a timing belt 14. These timing gears 16 and 18 are mounted, respectively, on first ends of camshafts 20 and 22 for use as first rotating members, and rotate integrally with these camshafts 20 and 22. Here the camshafts 20 and 22 are rotated at a rotational frequency half that of the crankshaft. The camshaft 20 is fitted with a plurality of intake cams 26, while the camshaft 22 is fitted with a plurality of exhaust cams 26. The intake cams 24 and the exhaust cams 26 are arranged in a pair for each cylinder.

The camshafts 20 and 22 extend parallel to each other along the longitudinal axis of the cylinder head 12, and the opposite end portions of these camshafts 20 and 22 are rotatably supported on the cylinder head 12 by means of end bearings 28, individually.

The camshaft 20 of the aforementioned valve drive system is provided with variable valve timing devices 30 in regions situated above cylinders #1 to #4, individually, and the camshaft 22 is also provided with variable valve timing devices 32 in regions situated above the cylinders #1 to #4, individually.

Figure 2:
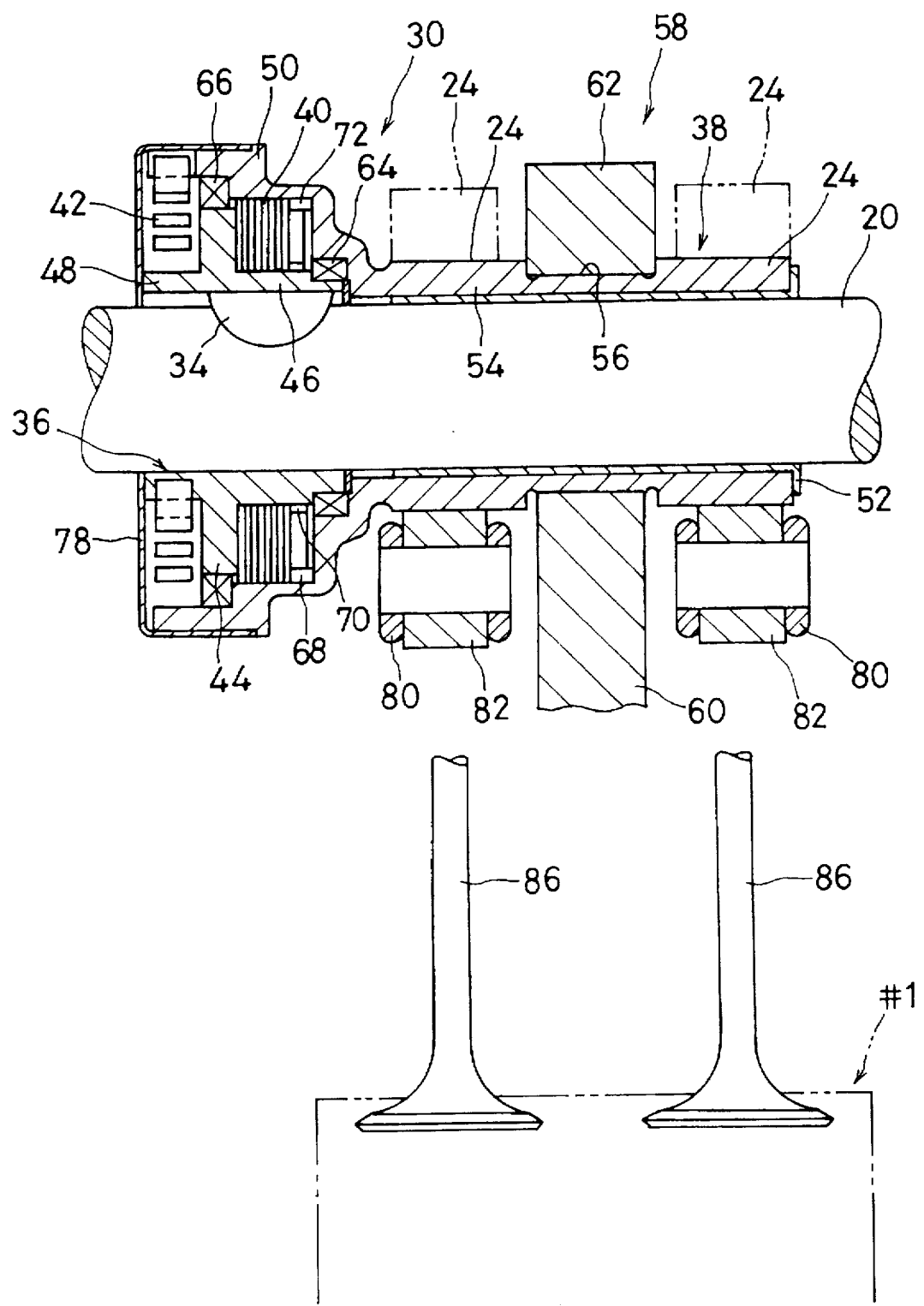
FIG. 2 is a sectional view of the system of FIG. 1.

Since these variable valve timing devices 30 and 32 according to a first embodiment have the same construction, the device 30 for the cylinder #1 will now be described with reference to FIG. 2.

Broadly, the variable valve timing device 30 includes an inner sleeve 36 mounted on the camshaft 20 by means of a semilunar key 34, a cylindrical cam robe 38, surrounding the camshaft 20, for use as a second rotating member, a viscous coupling 40 interposed between the cam robe 38 and the inner sleeve 36, and a spiral spring 42 interposed between the cam robe 38 and the inner sleeve 36.

The inner sleeve 36 has a boss and a flange 44. The flange 44 is formed integrally on the outer peripheral surface of the boss. This flange 44 divides the boss of the inner sleeve 36 between an inside boss portion and an outside boss portion.

The cam robe 38 includes a large-diameter cylindrical portion 50 which covers the whole inner sleeve 36, and a small-diameter cylindrical portion 54 which is mounted on the camshaft 20 by means of a metal bearing 52. A neck portion 56 is formed on the central portion of the outer peripheral surface of the small-diameter cylindrical portion 54. The neck portion 56 is rotatably supported on the cylinder head 12 by means of a central bearing 58. This central bearing 58 includes a cam journal 60 which protrudes integrally from the cylinder head 12, and a cam cap 62. The neck portion 56 is held between the cam journal 60 and the cam cap 62. The cam cap 62 is fitted on the neck portion 56 of the cam robe 38, and fixed to the cam journal 60 by means of a pair of bolts (not shown). Thus, the axial movement of the cam robe 38 is prevented by the cam cap 62, and the cam cap 62 is used to position the cam robe 38 with respect to the axial direction.

Ring-shaped seals 64 and 66 are located between the distal end portion of the inside boss portion 46 and the inner peripheral surface of the large-diameter cylindrical portion 50, and between the flange 44 and the inner peripheral surface of the large-diameter cylindrical portion 50, respectively. These seals 64 and 66 liquid-tightly keep an oil chamber 68 defined between the inner sleeve 36 and the cam robe 38 while allowing relative rotation of these members. The oil chamber 68 is filled with silicone oil which has a predetermined viscosity.

The viscous coupling 40 includes a plurality of inner plates and a plurality of outer plates. The inner plates are nonrotatably mounted on the inside boss portion 46, while the outer plates are nonrotatably attached to the large-diameter cylindrical portion 50. More specifically, the outer peripheral surface of the inside boss portion 46 and the inner peripheral surface of the large-diameter cylindrical portion 50 are formed with splines 70 and 72, respectively. The inner periphery of each inner plate is in engagement of the spline 70 of the inside boss portion 46, while the outer periphery of each outer plate is in engagement with the spline 72 of the large-diameter cylindrical portion 50.

Figure 3:
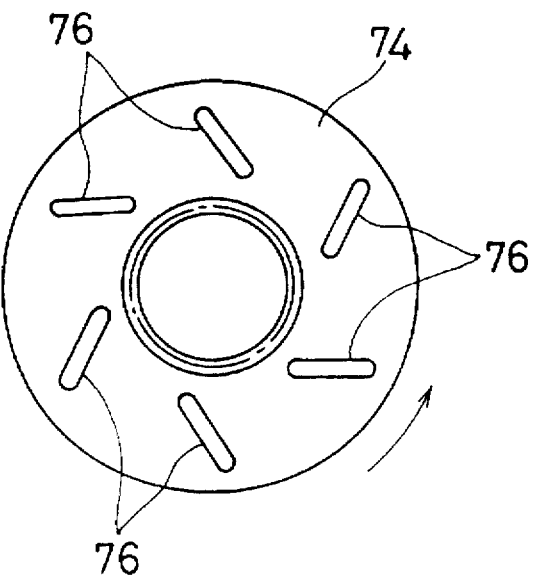
FIG. 3 is a plan view showing an inner plate of a viscous coupling of FIG. 1.

As shown in FIG. 3, each of the inner plates 74 has a plurality of slits 76, which are arranged at regular intervals in the circumferential direction of the inner plate 74. In FIG. 3, each of the slits 76 is inclined so that its inner end is situated closer to the center of the inner plate 74 as compared to its outer end with respect to the rotating direction of the camshaft 20 indicated by the arrow.

The aforesaid slits 76 may be provided in each of the outer plates in place of the inner plates 74.

Figure 4:
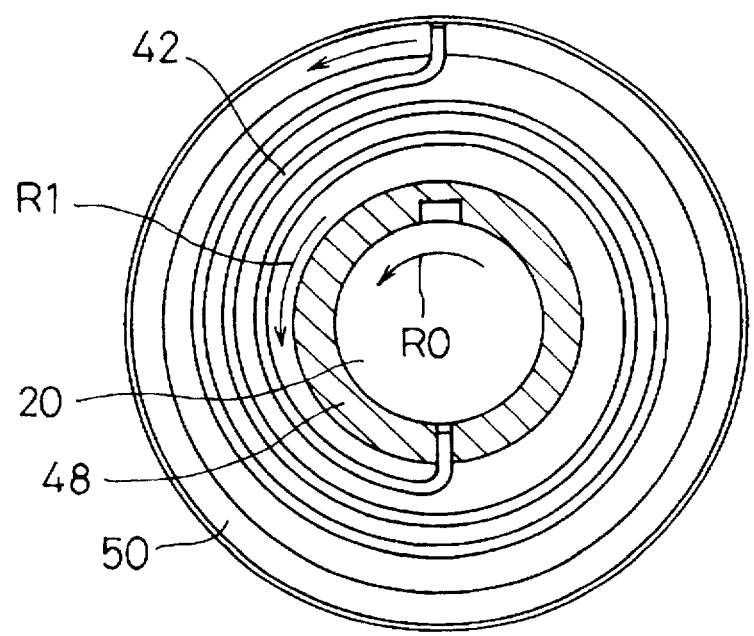
FIG. 4 is a front view of a spiral spring for connecting a cam robe and an inner sleeve.

As shown in FIG. 4, the inner end of the spiral spring 42 is fixed to the outer peripheral surface of the outside boss portion 48, while the outer end of the spiral spring 42 is fixed to an open end of the large-diameter cylindrical portion 50. Moreover, the spiral spring 42 is covered by cup-shaped cover 78. An open end of the cover 78 is fixed to the outer peripheral surface of the large-diameter cylindrical portion 50.

The small-diameter cylindrical portion 54 of the cam robe 38 is formed integrally with a pair of intake cams 24, and these intake cams 24 have the same profile.

Figure 5:
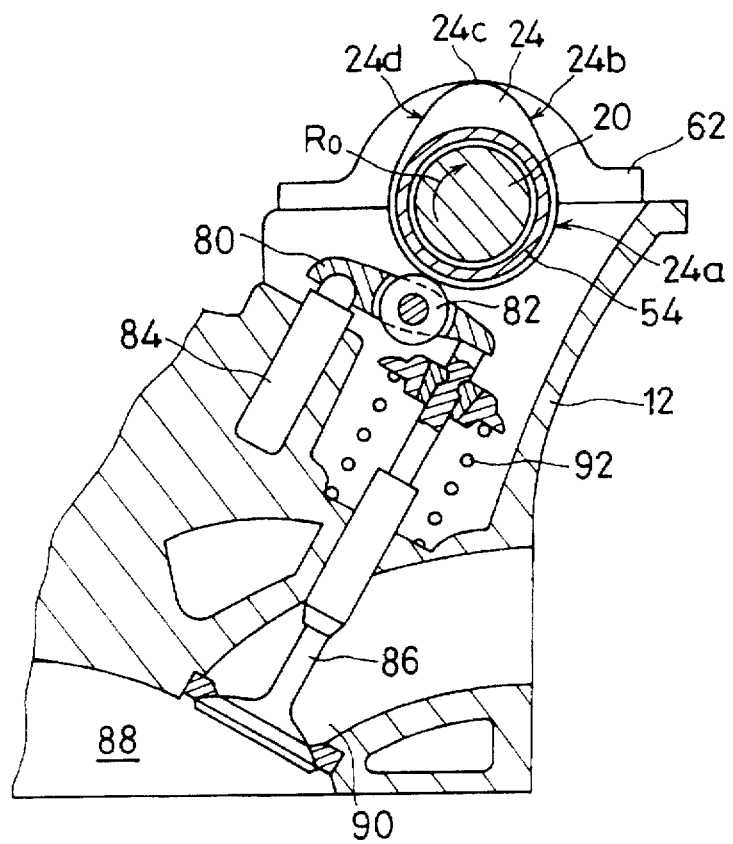
FIG. 5 is a longitudinal sectional view of the system of FIG. 1.

Referring to FIG. 5, there is shown a rocker arm 80 which cooperates with the one intake cam 24. A roller 82 is rotatably supported on the rocker arm 80 and this roller 82 is in rolling contact with the intake cam 24. One end of the rocker arm 80 is supported on a hydraulic lash adjuster 84 mounted on the cylinder head 12. The lash adjuster 84 serves continually to remove a gap between a base circle face 24a of the intake cam 24 and the roller 82 on the rocker arm 80.

The other end of the rocker arm 80 abuts against the upper end of a valve stem of an intake valve 86. The intake valve 86 is subjected to an urging force of a valve spring 92 in the direction to close an intake port 90 which opens into a combustion chamber 88, that is, upward as in FIG. 5.

When the intake cam 24 is rotated together with the camshaft 20, the intake cam 24 causes the intake valve 86 to vertically reciprocate through the medium of the rocker arm 80 and the valve spring 92, following its cam profile. Thus, the intake valve 86 opens the intake port 90 cyclically.

A similar valve drive mechanism is also provided between the other intake cam 24 of the cam robe 38 and its corresponding intake valve 86, and a pair of intake valves 86 of the cylinder #1 open and close their respective intake ports in synchronism with each other.

On the other hand, a pair of exhaust valves 94 (see FIG. 1) of the cylinder #1 are opened and closed by means of similar valve drive mechanism as the exhaust cam 26 is rotated together with the camshaft 22.

The following is a description of the operation of the variable valve timing device 30.

When the rotatory force of the camshaft 20 is transmitted from the inner sleeve 36 to the cam robe 38 through the spiral spring 42 and the viscous coupling 40 as the camshaft 20 rotates, the cam robe 38 is also rotated.

In the condition that the rotating speed of the engine 10 or the camshaft 20 is in a low-speed rotation region, the transmission torque of the viscous coupling 40, which is the bonding force between its inner and outer plates, is relatively low. In this region, the viscous coupling 40 allows the inner sleeve 36 and the cam robe 38 to relatively rotate to each other. When the rotating speed of the camshaft 20 is in a high-speed rotation region, on the other hand, the bonding force between the inner and outer plates of the viscous coupling 40 increases, so that the viscous coupling 40 connects the inner sleeve 36 and the cam robe 38 integrally to each other.

When a lift face 24b of the intake cam 24 which is continuous with the base circle face 24a, depresses the rocker arm 80 through the medium of the roller 82 as the intake cam 24 rotates, the intake cam 24 is subjected to a reaction force from the roller 82 on the rocker arm 80 due to the urging force of the valve spring 92. The line of action of this reaction force is opposite to a rotating direction Ro (see FIG. 5) of the intake cam 24. Thus, the intake cam 24 (outer plates of viscous coupling 40) rotates with a delay with respect to the camshaft 20 (inner plates of viscous coupling 40). As a result, the speed of increase of the valve lift of the intake valve 86 is lower than in the case where the camshaft 20 and the intake cam 24 rotate integrally with each other when the rotating speed of the engine 10 is in the high-speed rotation region.

Figure 6:
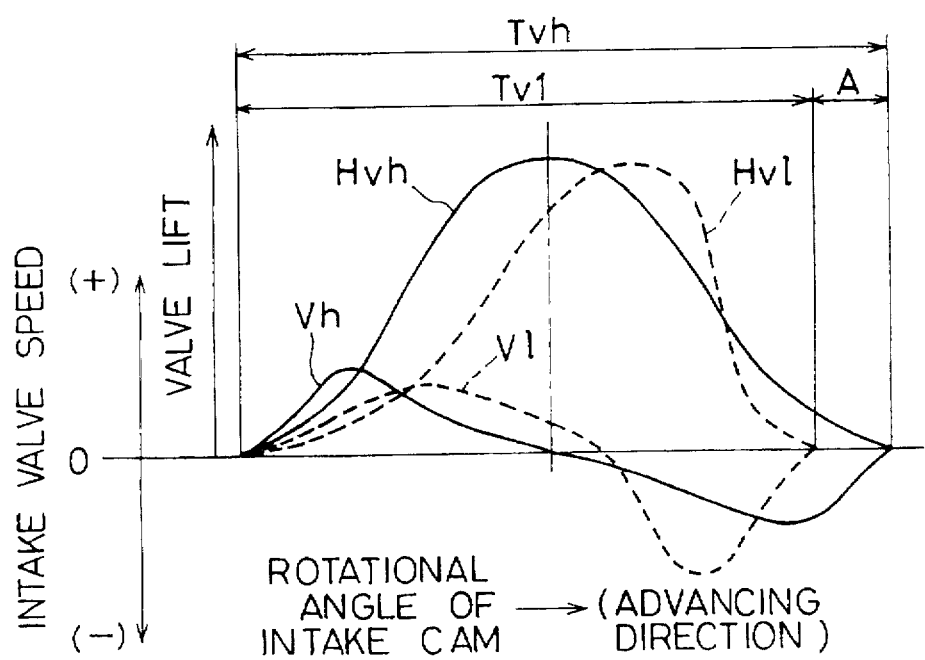
FIG. 6 is a graph showing valve lift characteristics based on the system of FIG. 1.

Referring to FIG. 6, there are shown valve lift characteristics of the intake valve 86. In FIG. 6, valve lift characteristics Hvh and Hvl indicated by a full line and a broken line represent the cases where the rotating speed of the engine 10 is in the high-speed rotation region and the low-speed rotation region, respectively. When the valve lift characteristics Hvh and Hvl are compared, the increasing speed of the valve lift of the intake valve 86 is found to be lower in the low-speed rotation region than in the high-speed rotation region. As is evident from the above description, this delay of the increasing speed of the valve lift decreases as the rotating speed of the engine 10 increases.

After the intake valve 86 is lifted to open the intake port 90, the cam robe 38, which is formed integrally with the intake cam 24, rotates in a manner such that the spiral spring 42 is elastically deformed in a winding direction R1 (see FIG. 4). Thus, the rotational angular speed of the cam robe 38 becomes lower than the rotational angular speed of the camshaft 20. As seen from the valve lift characteristic Hvl, indicated by broken line in FIG. 6, the valve lift of the intake valve 86 is subject to a delay with respect to the valve lift obtained in the high-speed rotation region, and the speed of the valve lift is lower than the speed of the valve lift obtained in the high-speed rotation region.

In connection with this, FIG. 6 also shows the change of the lift speed associated with the valve lift of the intake valve 86. Lift speed characteristics Vh and Vl indicated by full line and broken line represent the cases where the rotating speed of the engine 10 is in the high-speed rotation region and the low-speed rotation region, respectively. When the lift speed characteristics Vh and Vl are compared, it is seen that the rise of the valve opening speed of the intake valve 86 when the rotating speed of the engine 10 is in the low-speed rotation region is slower than the rise of the valve opening speed in the high-speed rotation region, and that the maximum valve opening speed in the low-speed rotation region is lower than the maximum valve opening speed in the high-speed rotation region.

When a return face 24d of the intake cam 24 abuts the roller 83 of the rocker arm 80, following a cam top 24c of the cam, after the rotation of the intake cam 24 is advanced so that the roller 83 is passed by the lift face 24b of the intake cam 24, the intake valve 84 is subjected to the urging force of the valve spring 92, and moves in the valve closing direction. In this case, the urging force of the valve spring 92, which works on the intake cam 24 via the rocker arm 80, acts in the rotating direction of the intake cam 24, and the intake cam 24 is also subjected to the restoring force of the spiral spring 42 in its rotating direction through the cam robe 38. Thus, the rotation of the intake cam 24 advances with respect to the camshaft 20, and the spiral spring 42 is rewound and restored to its original state.

As seen from the valve lift characteristic Hvl, as indicated by the broken line in FIG. 6, the intake valve 86 closes the intake port 90 earlier in the low-speed rotation region than in the high-speed rotation region by an advanced angle A in terms of the rotational angle of the intake cam 24. As seen from the lift speed characteristic V1, as indicated by broken line in FIG. 6, moreover, the valve closing speed of the intake valve 86 in the low-speed rotation region becomes higher than in the high-speed rotation region. As a result, a valve-open period Tvl of the intake valve 86 for the low-speed rotation region is made shorter than a valve-open period Tvh for the high-speed rotation region.

Figure 7:
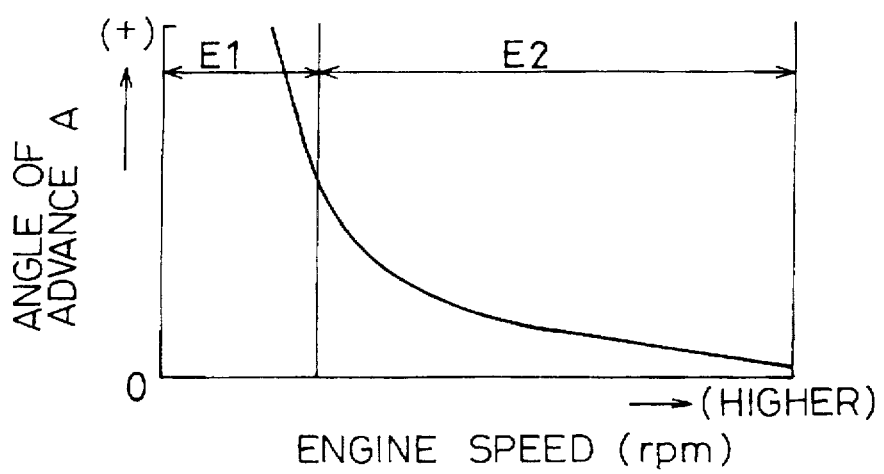
FIG. 7 is a graph showing an advanced angle of the valve closing timing compared with the engine speed.

As shown in FIG. 7, the advanced angle A increases to reach its maximum value Amax (e.g., 30°) as the rotating speed of the engine 10 lowers. In FIG. 7, E1 and E2 represent the low-speed rotation region and high-speed rotation region of the engine 1, respectively. Further, the advanced angle A can be adjusted in accordance with the viscosity of silicone oil in the viscous coupling 40 and the spring constant of the spiral spring 42.

Figure 8:
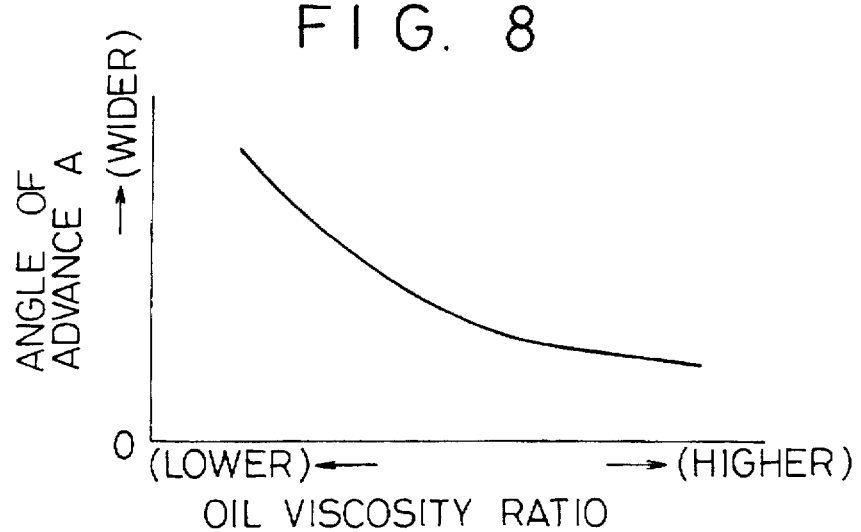
FIG. 8 is a graph showing an advanced angle of the valve closing timing compared with the oil viscosity ratio of the viscous coupling.

Referring to FIG. 8, the ratio of the viscosity of the silicone oil used to the viscosity of silicone oil for reference and the advanced angle A are represented by the axes of abscissa and ordinate, respectively. As shown in FIG. 8, the advanced angle A is decreased as the viscosity ratio increases.

Figure 9:
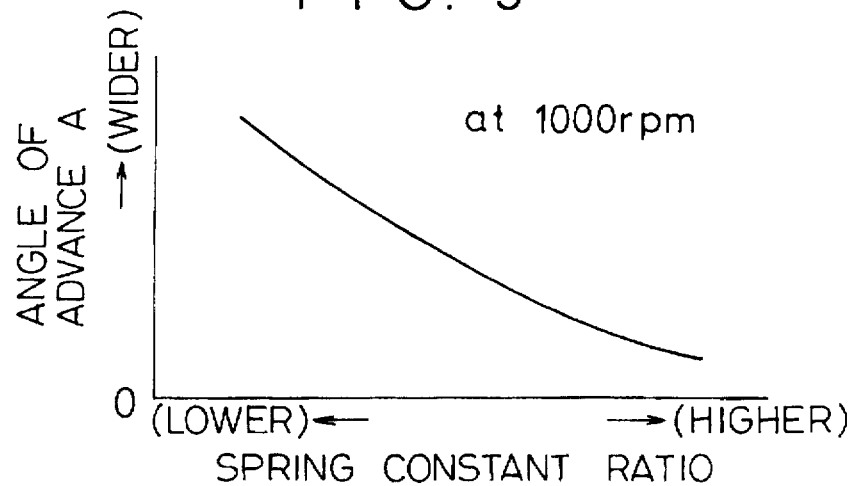
FIG. 9 is a graph showing an advanced angle of the valve opening timing compared with the spring constant ratio of the spiral spring.

Referring to FIG. 9, the ratio of the spring constant of the spiral spring used to the spring constant of a spiral spring for reference and the advanced angle A are represented by the axes of abscissa and ordinate, respectively. As shown in FIG. 9, the advanced angle A is decreased as the spring constant ratio increases. FIG. 9 shows the result of an experiment conducted with the rotating speed of the camshaft 24 being constant(1,000 rpm).

While the base circle face 24a of the intake cam 24 is passing by the roller 82 on the rocker arm 80, the spiral spring 42 restores the intake cam 24 to its initial rotational angle position with respect to the camshaft 20.

When the engine 10 or the camshaft 20 is in the high-speed rotation region, the transmission torque of the viscous coupling 40, that is, the bonding force between its inner and outer plates, increases. As the rotating speed of the camshaft 20 increases, consequently, the viscous coupling 40 gradually ceases to allow the inner sleeve 36 and the cam robe 38 to relatively rotate to each other.

When the intake cam 24 depresses the roller 82 on the rocker arm 80 by means of its lift face 24b as the intake cam 24 rotates with the rotating speed of the camshaft 20 in the high-speed rotation region, the intake cam 24 is subjected to the reaction force from the roller 82 on the rocker arm 80, based on the urging force of the valve spring 92. This reaction force acts in the direction opposite to the rotating direction of the intake cam 24. In this case, however, the transmission torque of the viscous coupling 40 is so high that the starting timing for the valve lift of the intake valve 86 is subject to only a small delay with respect to the start timing for the case where the intake cam 24 is connected integrally to the camshaft 20. Thus, as seen from the valve lift characteristic Hvh, as indicated by full line in FIG. 6, the starting timing for the valve lift in the high-speed operation region is earlier than the starting timing in the case of the low-speed operation region.

Even though the rotation of the intake cam 24 advances after the intake valve 86 is lifted to open the intake port 90, relative rotation between the intake cam 24 (cam robe 38) and the camshaft 20 (inner sleeve 36) is slight. Therefore, the elastic deformation of the spiral spring 42 is also only slight, since the transmission torque of the viscous coupling 40 is high.

In this case, the valve lift and lift speed of the intake valve 86 change in accordance with the valve lift characteristic Hvh and the lift speed characteristic Vh, as indicated by full lines in FIG. 6, and the valve opening speed of the intake valve 86 is higher than in the case for the low-speed operation region.

Even though the rotation of the intake cam 24 advances so that the return face 24d of the intake cam 24 reaches the surface of the roller 82 on the rocker arm 80, the relative rotation between the intake cam 24 and the cam robe 38 is also slight in this case, since the transmission torque of the viscous coupling 40 is high. Thus, the valve closing speed of the intake valve is substantially equal to the valve opening speed.

Since the transmission torque of the viscous coupling 40 is greater than the restoring force of the spiral spring 42 when the rotating speed of the camshaft 20 is in the medium or high-speed rotation region, it is difficult for the intake cam 24 to return to its initial rotational angle position with respect to the camshaft 20, and this return is subject to a delay. This delay will disturb the rise portion of the valve lift characteristic of the intake valve 86. As mentioned before, however, each of inner plates 74 of the viscous coupling 40 has a plurality of slits 76 (see FIG. 3). When the intake cam 24 returns to its initial rotational angle position, the silicone oil in the viscous coupling 40 is therefore centralized through the slits 76, so that the transmission torque of the viscous coupling 40 is reduced. Thus, the intake cam 24 can quickly return to its initial rotational angle position by means of the restoring force of the spiral spring 42.

The variable valve timing device 32 on the exhaust side of the cylinder #1 and the variable valve timing devices 30 and 32 for the cylinders #2 to #4 operate in the same manner.

Figure 10:
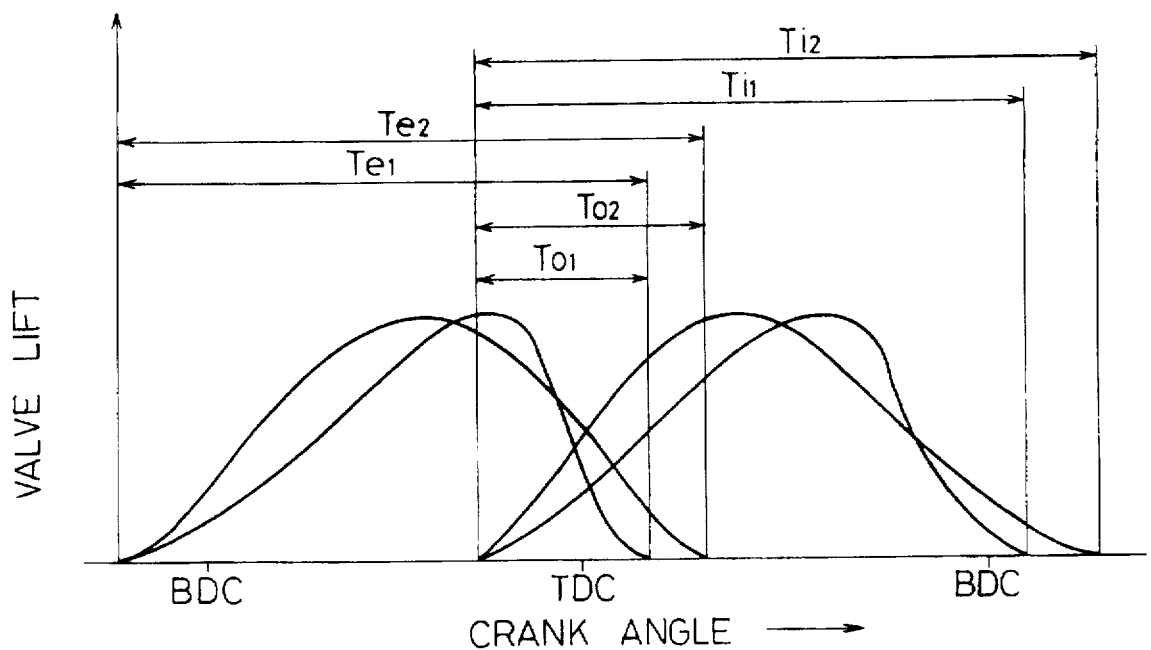
FIG. 10 is a graph showing valve lift characteristics of intake and exhaust valves compared with the crank angle.

According to the engine 10 provided with the variable valve timing devices 30 and 32 described above, valve-open periods Ti1 and Te1 of the intake and exhaust valves 86 and 94 become shorter than valve-open periods which are settled depending on the cam profiles of the intake and exhaust cams 24 and 26 when the rotating speed of the engine 10 is in the low-speed rotation region, as shown in FIG. 10. Thus, an overlap period To1 between the valve-open periods Ti1 and Te1 is shortened, so that blow-by of the engine 10 or discharge of raw gas can be prevented. As a result, idling of the engine 10 can be stabilized, in particular.

When the rotating speed of the engine 10 is in the high-speed rotation region, on the other hand, the force of inertia of intake air into the engine 10 is increased. In this case, since valve-open periods Ti2 and Te2 of the intake and exhaust valves 86 and 94 are longer than the valve-open periods Ti1 and Te1 for the low-speed rotation region, as shown in FIG. 10, an overlap period To2 between these valve-open periods Ti2 and Te2 is also longer, so that supercharging efficiency of intake air and exhaust efficiency can be improved individually.

Figure 11:
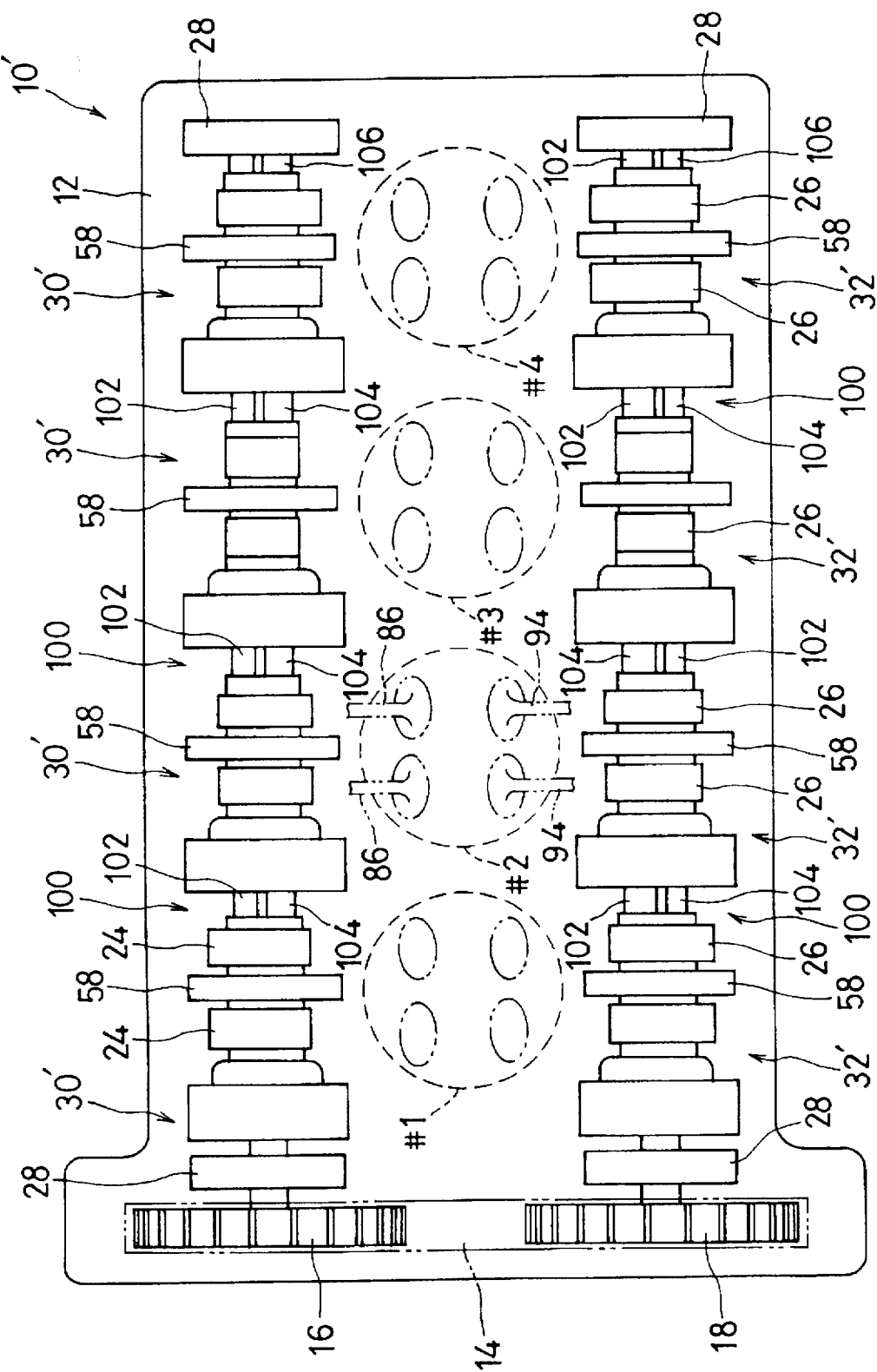
FIG. 11 is a plan view showing a valve drive system according to a second embodiment.

Referring then to FIG. 11, there is shown an engine 10' which comprises with variable valve timing devices 30' and 32' according to a second embodiment. In the description of the engine 10' and the devices 30' and 32', and in the description of other embodiments to follow, similar reference numerals are used to designate the members and parts which have the same functions as the members and parts in the variable valve timing devices of the foregoing embodiment, and a description of those members and parts will be omitted.

Figure 12:
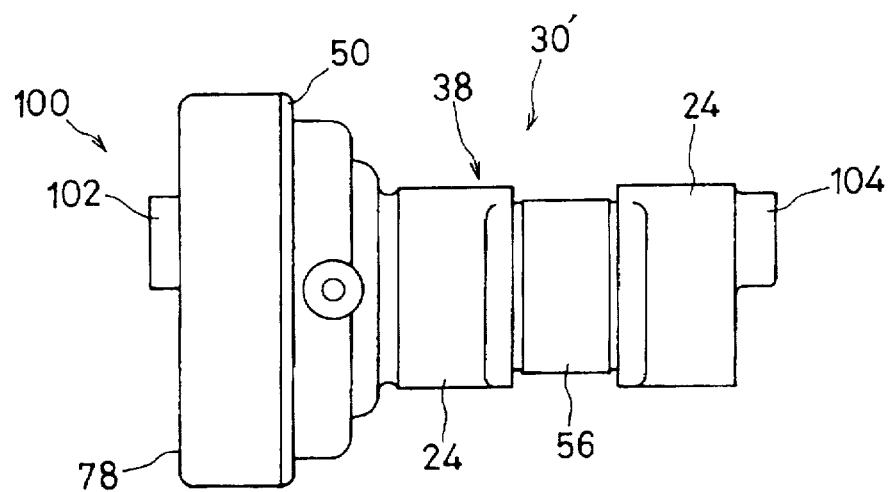
FIG. 12 is a side view of a cam robe of the system of FIG. 11.
Figure 13:
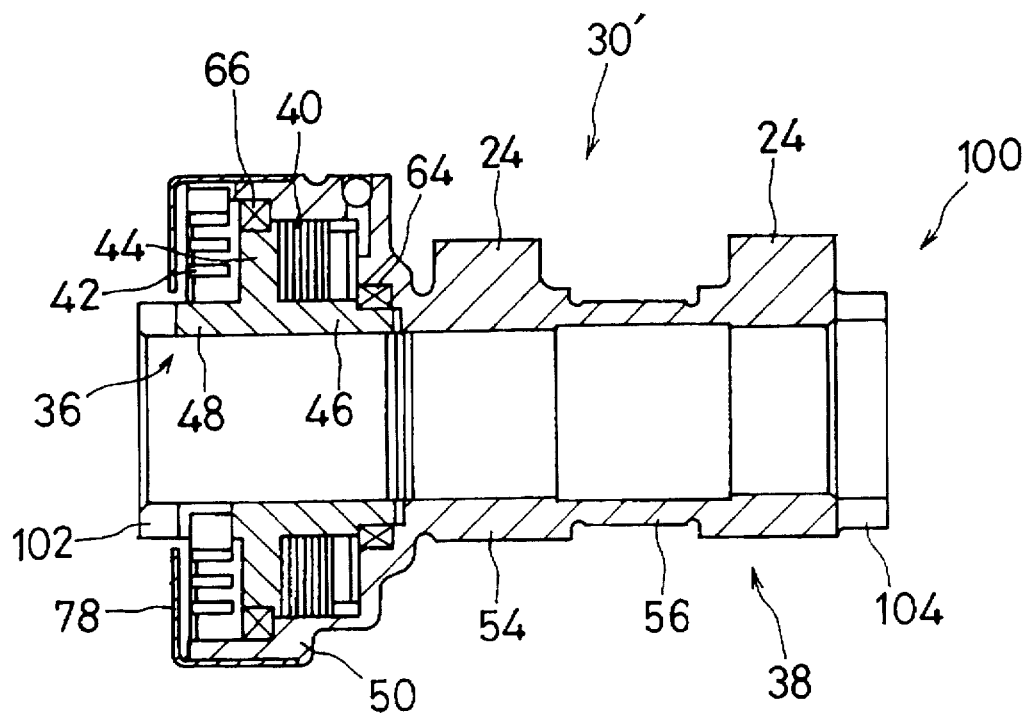
FIG. 13 is a sectional view of the cam robe of FIG. 12.

The variable valve timing devices 30' and 32', like those in the first embodiment, are mounted on camshafts 20 and 22, respectively, corresponding to cylinders #1 to #4. The device 30' for the cylinder #2, among the devices 30' and 32', is shown in FIGS. 12 and 13.

Figure 14:
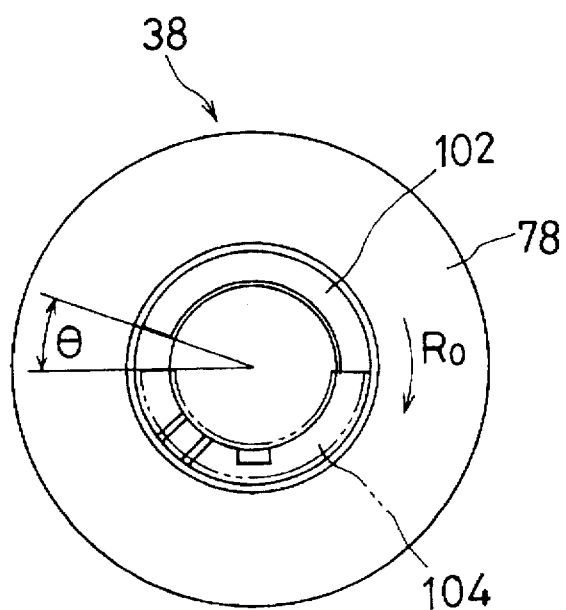
FIG. 14 is a front view of the cam robe of FIG. 12.

The variable valve timing device 30' is further provided with a dog clutch 100 for restraining relative rotation between a cam robe 38 and the camshaft 20. This dog clutch 100 has a first tooth 102 on the side of an inner sleeve 36 and a second tooth 104 on the side of the cam robe 38. The first tooth 102 protrudes integrally from an end portion of an outside boss portion 48 of the inner sleeve 36, and can rotate integrally with the camshaft 20. As shown in FIG. 14, the first tooth 102 extends in the circumferential direction of the outside boss portion 48, covering a region narrower than a semicircle of the outside boss portion 48 by an angle θ.

Figure 15:
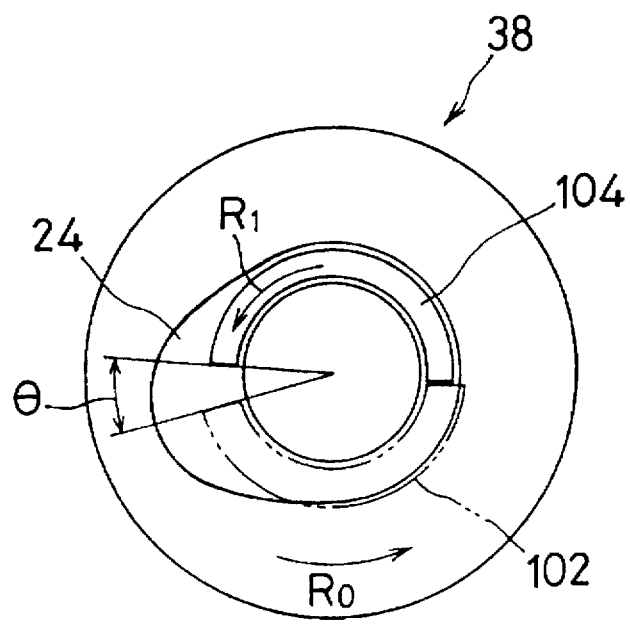
FIG. 15 is a rear view of the cam robe of FIG. 12.

On the other hand, the second tooth 104 protrudes integrally from an end portion of a small-diameter cylindrical portion 54 of the cam robe 38, and rotates integrally with the cam robe 38 or an intake cam 24. As shown in FIG. 15, the second tooth 104 is in the form of a circular arc having an inside diameter substantially equal to that of the first tooth 102, and extends covering a semicircle of the small-diameter cylindrical portion 54.

As shown in FIGS. 14 and 15, the first tooth 102 of the device for the cylinder #2 is in a state such that its front end abuts against the second tooth 104 of the device 30' for the cylinder #1 with respect to the rotating direction Ro of the camshaft 20, while the second tooth 104 of the cylinder #2 is in a state such that its rear end abuts against the first tooth 102 of the device 30' for the cylinder #3.

Figure 16:
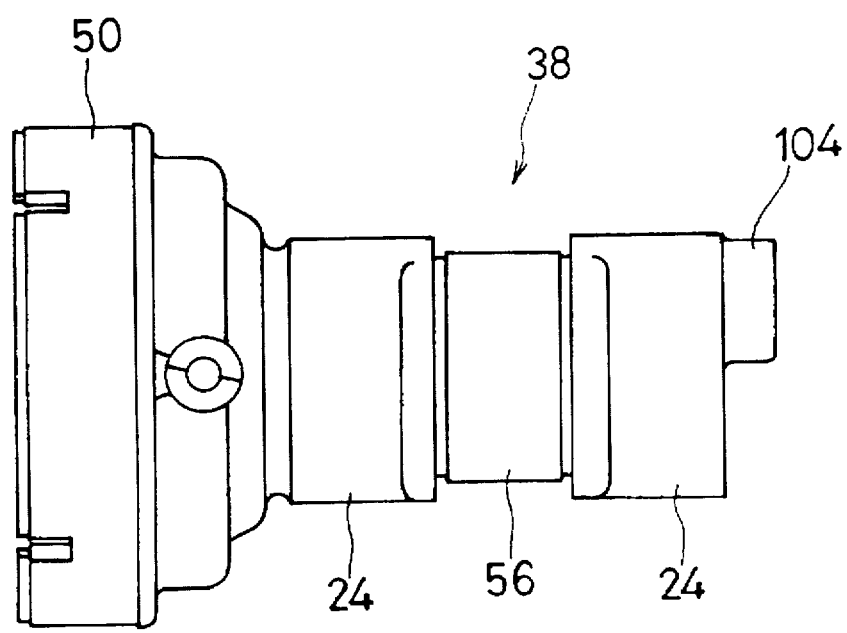
FIG. 16 is a side view of a cam robe applied to a cylinder #1 of the internal combustion engine of FIG. 11.

The first tooth 102 of the device 30' for the cylinder #1 is omitted, as shown in FIG. 16, while the second tooth 104 of the device 30' for the cylinder #4 abuts in like manner against a second tooth 106 which is mounted on the camshaft 20, as shown in FIG. 11. This second tooth 106 has the same shape and function as the first tooth 102.

The first and second teeth 102 (106) and 104 between the other adjacent devices 30' and between the adjacent variable valve timing devices 32' on the side of the camshaft 22 are engaged in the same relation.

Since the variable valve timing devices 30' and 32' operate in the same manner, the operation of the device 30' for the cylinder #2 will be described below.

When the rotating speed of the engine 10' is in the low-speed rotation region, a viscous coupling 40 of the device 30' allows relative rotation between the camshaft 20 (inner sleeve 36) and the intake cam 24 (cam robe 38), as mentioned before.

When the intake cam 24 depresses a roller 82 on a rocker arm 80 by means of its lift face 24b as the intake cam 24 rotates, in this operating state of the engine 10', the intake cam 24 is subjected to the reaction force from the roller 82 on the rocker arm 80, as mentioned before. Although the viscous coupling 40 allows relative rotation between the camshaft 20 and the cam robe 38 in this case, however, the first tooth 102 (106) on the side of the camshaft 20 and the second tooth 104 of the cam robe 38, which cooperate with each other, are in engagement, so that the camshaft 20 and the cam robe 38 rotate integrally with each other. Accordingly, an intake valve 86 lifts following the cam profile of the intake cam 24, thereby opening an intake port 90. The rise portion of the lift of the intake valve 86 in this case is represented by a full-line portion of a valve lift characteristic Hvl in FIG. 17.

When the rotation of the intake cam 24 advances so that a return face 24d of the intake cam 24, following a cam top 24c, reaches the roller 82 on the rocker arm 80, the intake cam 24 is subjected to the restoring force of a valve spring 92 in its rotating direction through the roller 82 on the rocker arm 80. Hereupon, the first tooth 102 (106) on the side of the camshaft 20 and the second tooth 104 of the cam robe 38, which cooperate with each other, allow a relative displacement such that they move away from each other through the viscous coupling 40. The rotation of the intake cam 24 or the cam robe 38 with respect to the camshaft 20 is consequently advanced by means of the restoring force of the valve spring 92. As this is done, the spiral spring 42 is elastically deformed in the direction opposite to the winding direction R1.

Figure 17:
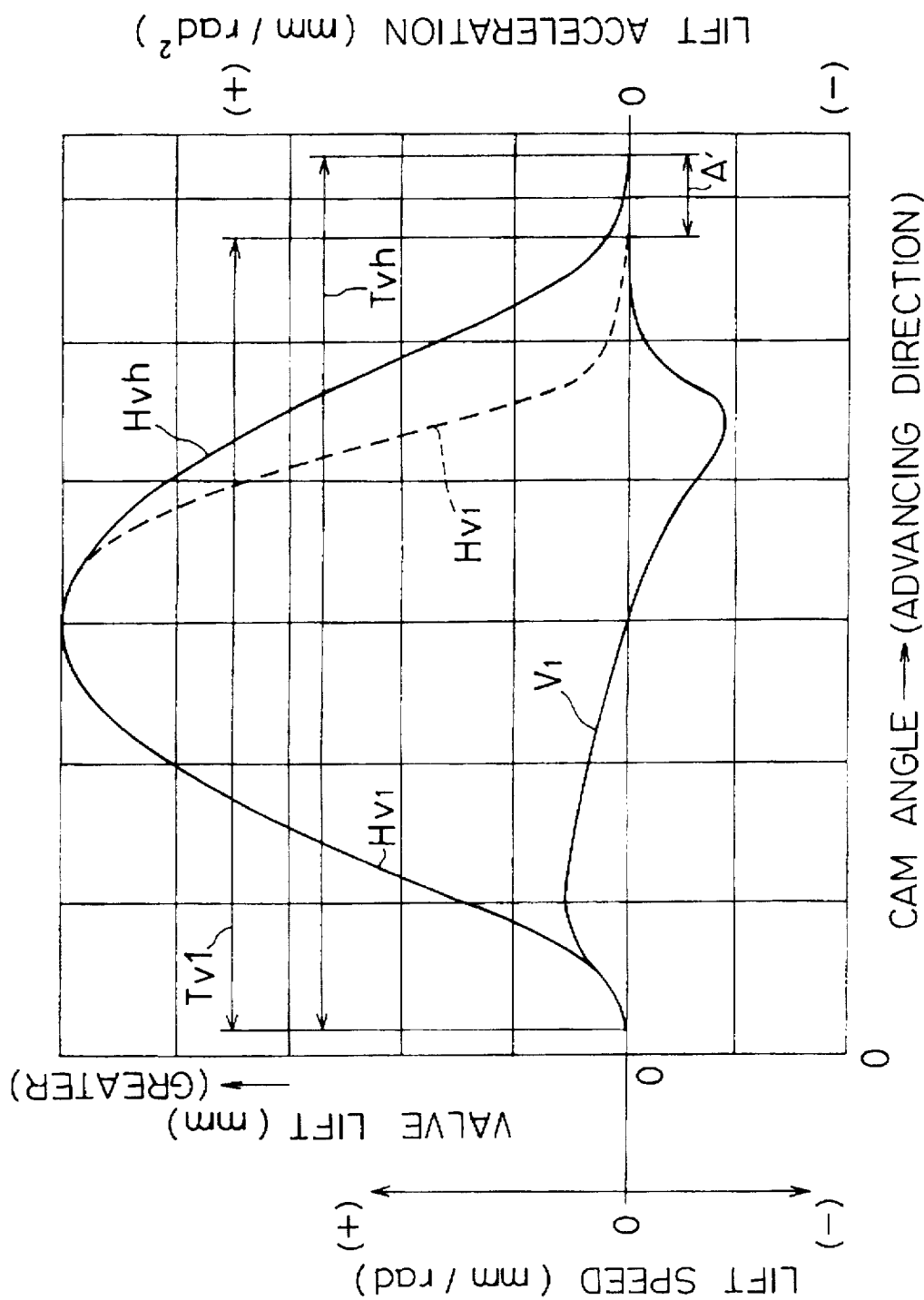
FIG. 17 is a graph showing valve lift characteristics based on the system of FIG. 11.

Accordingly, the valve closing timing of the intake valve 86 is earlier than in the case where the camshaft 20 and the intake cam 24 rotate integrally with each other. In this case, the fall portion of the lift of the intake valve 86 is represented by a broken-line portion of the valve lift characteristic Hvl in FIG. 17. The valve closing timing of the intake valve 86 is advanced by a advanced angle A' in terms of the rotation of the camshaft 20. This advanced angle A' increases to reach its maximum value Amax (e.g., 30°) as the rotating speed of the engine 10' lowers, as mentioned before. FIG. 17 also shows the lift speed characteristic V1 of the intake valve 86. As seen from this lift speed characteristic V1, the valve closing speed of the intake valve 86 increases.

While a base circle face 24a of the intake cam 24 is passing by the roller 82 on the rocker arm 80 after the intake valve 86 is closed, the intake cam 24 is restored to the initial rotational angle position with respect to the camshaft 20 by means of the restoring force of the spiral spring 42.

When the rotating speed of the engine 10' is in the low-speed rotation region, the valve-open period Tvl of the intake valve 86 is reduced by a margin corresponding to the advance of the valve closing timing thereof, although the valve opening timing of the intake valve 86 is constant, as mentioned before.

When the rotating speed of the engine 10' is in the high-speed rotation region, on the other hand, the transmission torque of the viscous coupling 40 increases in proportion to the rotating speed of the engine 10', as mentioned before, so that it is difficult to allow the relative rotation between the camshaft 20 (inner sleeve 36) and the intake cam 24 (cam robe 38).

In the case that the rotating speed of the engine 10' is in the high-speed rotation region, therefore, the intake cam 24 rotates substantially integrally with the camshaft 20, and the valve lift characteristic Hvh of the intake valve 86 is settled in accordance with the cam profile of the intake cam 24 even at its fall portion, as indicated by full line in FIG. 17. In consequence, the valve-open period Tvh of the intake valve 86 is longer than the valve-open period Tvl for the low-speed rotation region.

The variable valve timing devices 32' on the side of exhaust valves 94 function in the same manner as the aforementioned devices 30'.

Figure 18:
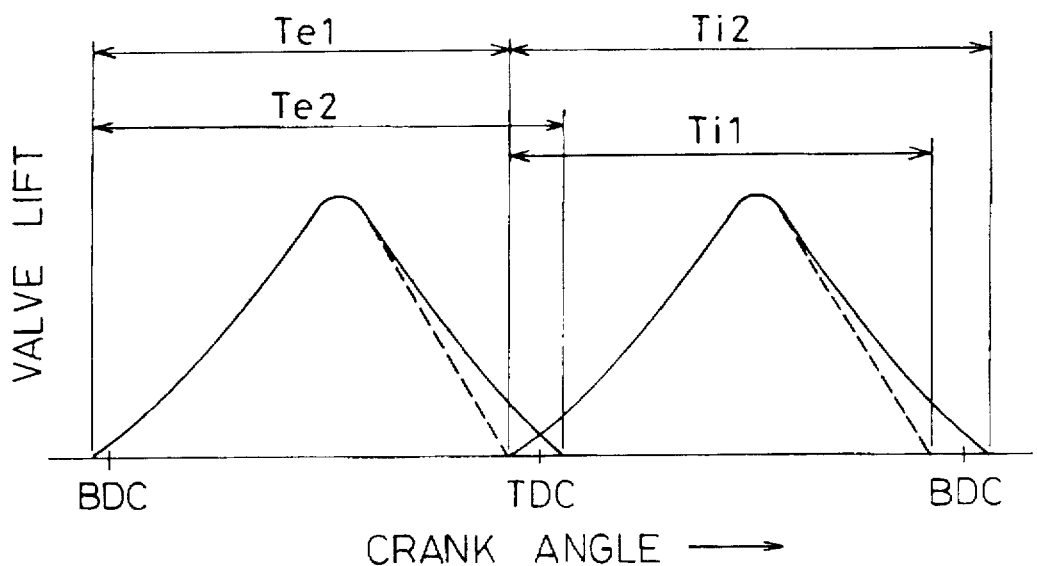
FIG. 18 is a graph showing valve lift characteristics of intake and exhaust valves compared with the crank angle.

Thus, according to the devices 30' and 32' of the second embodiment, although the valve opening timings of the intake and exhaust valves 86 and 94 are fixed in the whole operation region of the engine 10' by the function of the dog clutch 100, the valve closing timings of these valves vary depending on the rotating speed of the engine 10'. More specifically, although the valve-open periods Ti1 and Te1 of the intake and exhaust valves 86 and 94 are reduced individually, as shown in FIG. 18, when the rotating speed of the engine 10' is in the low-speed rotation region, these valve-open periods Ti2 and Te2 increase when the rotating speed of the engine 10' is in the high-speed rotation region.

Figure 19:
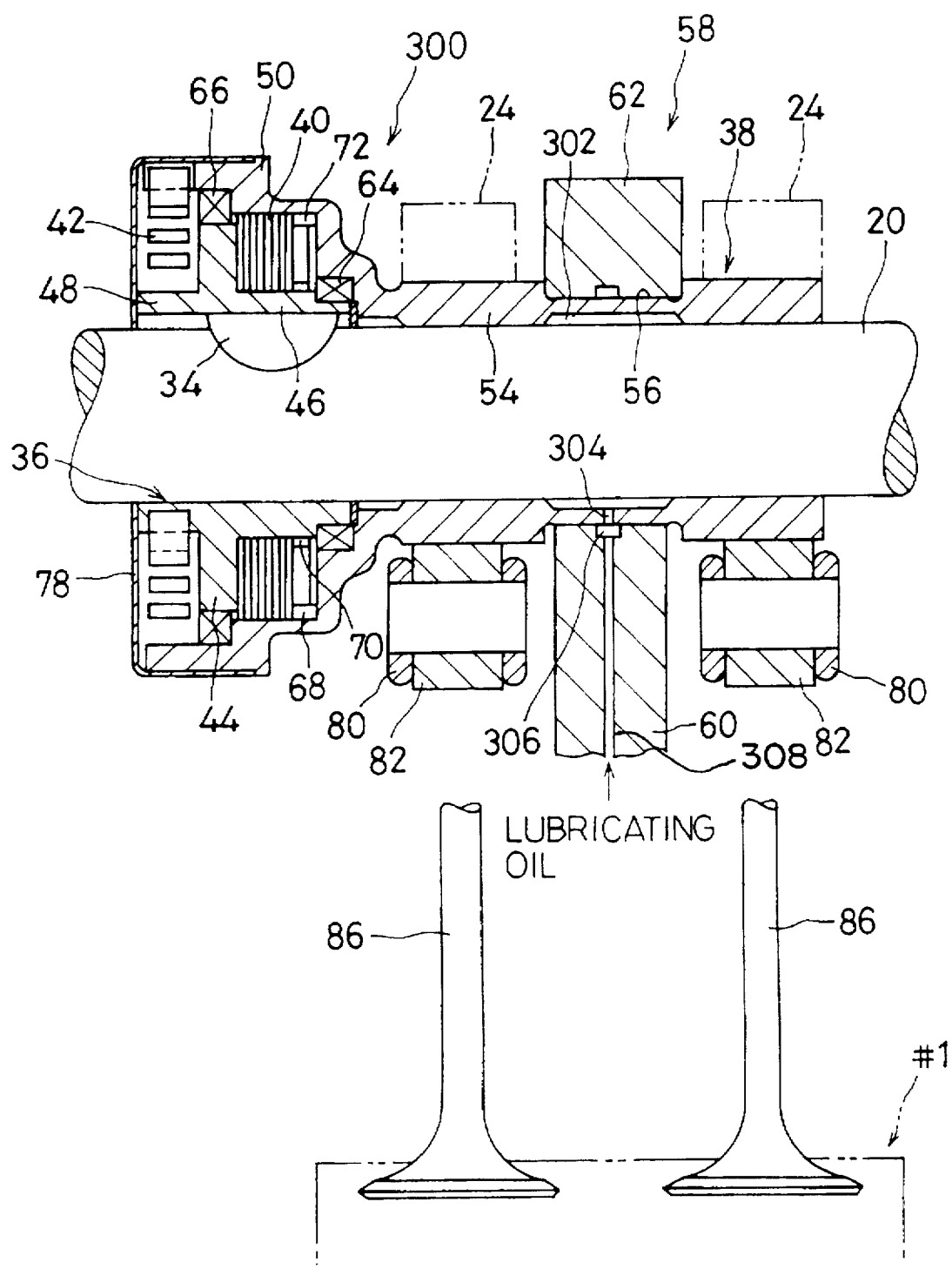
FIG. 19 is a sectional view showing a valve drive system according to a third embodiment.

Referring to FIG. 19, there is shown a variable valve timing device 300 according to a third embodiment which is applied to an intake valve 86. A cam robe 38 of this device 300 is mounted directly on a camshaft 20 for rotation, and an annular groove 302 is formed on the inner peripheral surface of the cam robe 38 in a region corresponding to a neck portion 56. One end of each of a plurality of radial holes 304 opens into the annular groove 302, and the respective other ends of the radial holes 304 opens on the outer peripheral surface of the neck portion 56 and are located in a same circle.

On the other hand, arcuate grooves are formed individually on the respective inner peripheral surfaces of a cam journal 60 and a cam cap 62 which hold the neck portion 56 of the cam robe 38, these arcuate grooves form one circumferential groove 306 on which the other end openings of the radial holes 304 face. A communication passage 308 is formed in the cam journal 60. One end of the communication passage 308 is connected to the circumferential groove 306, while the other end thereof is connected to a lubricating oil supply channel (not shown) in a cylinder head. Thus, lubricating oil in this supply channel is fed into the annular groove 302 through the circumferential groove 306 and the radial holes 304, whereby the annular chamber 302 is filled with the lubricating oil.

The variable valve timing device 300 of the third embodiment, as described above, unlike the device 30 of the first embodiment, does not require the metal bearing 52, so that the number of components of the device 300 is smaller. The lubricating oil in the annular chamber 302 oozes out onto the respective sliding contact surfaces of the camshaft 20 and the cam robe 38, and reduces wear of these sliding contact surfaces.

Figure 20:
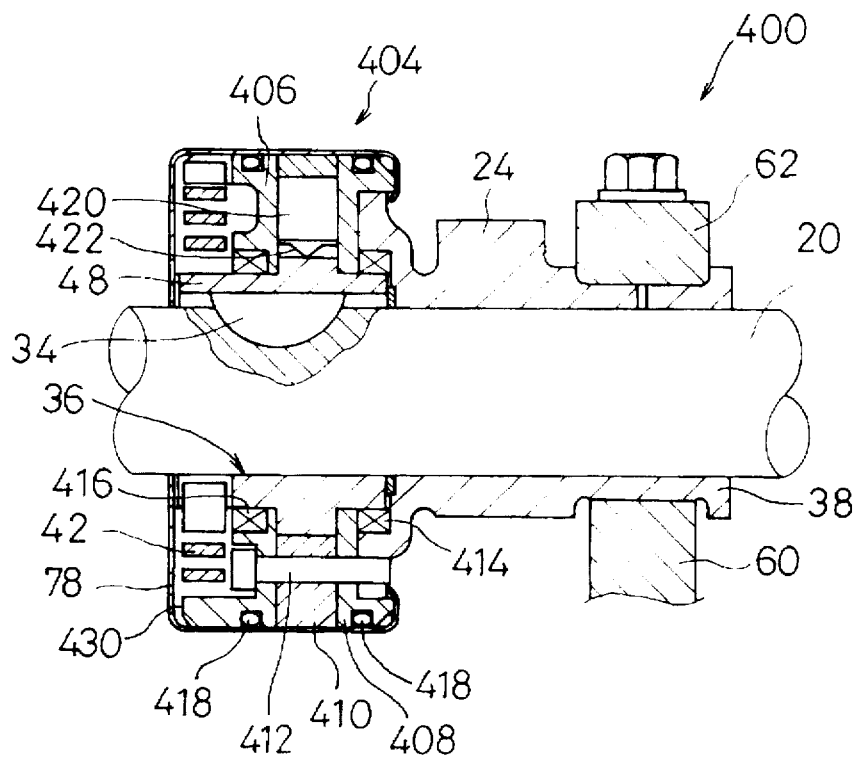
FIG. 20 is a longitudinal sectional view showing part of a valve drive system according to a fourth embodiment.
Figure 21:
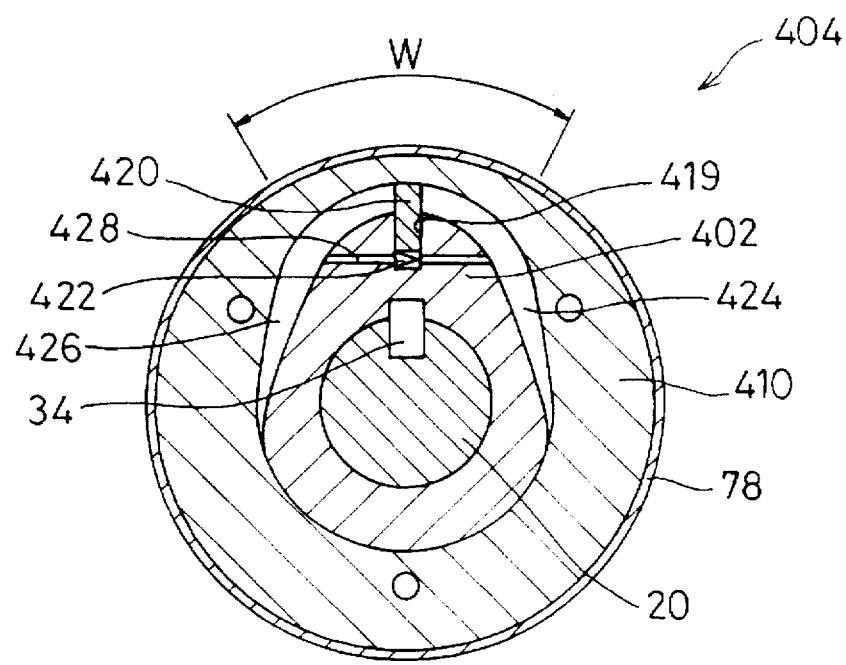
FIG. 21 is a cross-sectional view showing part of the system of FIG. 20.

Referring now to FIGS. 20 and 21, there is shown a variable valve timing device 400 according to a fourth embodiment which is applied to an intake valve 86. An inner sleeve 36 of this device 400 has an egg-shaped bulging portion 402 in place of the aforementioned flange 44, and a cam robe 38 has an outer casing 404 in place of the aforementioned large-diameter cylindrical portion 50. This outer casing 404 includes a pair of side rings 406, 408 which hold the bulging portion 402 from both sides thereof, and an intermediate ring 410 which surrounds the bulging portion 402 externally. These rings are connected to the cam robe 38 by means of a plurality of connecting bolts 412. Inside seals 414 and 416 are arranged between the cam robe 38 and the inner sleeve 36 and between the side ring 406 and the inner sleeve 36, respectively. Outside seals 418 are arranged between a cover 78 and the respective outer peripheral surfaces of the side rings 406 and 408, individually.

As seen from FIG. 21, part of the inner peripheral surface of the intermediate ring 410 forms a circular arc with which the arcuate surface of the bulging portion 402 is in sliding contact, and a space is secured between the remaining portion of the inner peripheral surface and the outer peripheral surface of the bulging portion 402. Thus, the bulging portion 402 can rotate with respect to the intermediate ring 410 within the range of a rotational angle region W shown in FIG. 21.

A hole 419 is formed in the top portion of the bulging portion 402, and this hole 419 extends in the radial direction of the bulging portion 402. A vane 420 is slidably fitted in the hole 419, and a spring 422 is disposed between the bottom of the hole 419 and the inner end of the vane 420. This spring 422 urges the vane 420 in a direction such that the vane 420 projects from the hole 419. Thus, the outer end of the vane 420 abuts against the inner peripheral surface of the intermediate ring 400, thereby dividing the space between the intermediate ring 410 and the bulging portion 402 into a pair of liquid chambers 424 and 426.

The bulging portion 402 is formed with a communication passage 428 which intersects with the lower part of the hole 419, and this communication passage 428 opens into the liquid chambers 424 and 426 at the opposite ends of the bulging portion 402. Thus, the liquid chambers 424 and 426 are connected to each other by means of the communication passage 428. The liquid chambers 424 and 426 and the communication passage 428 are filled with oil.

Figure 22:
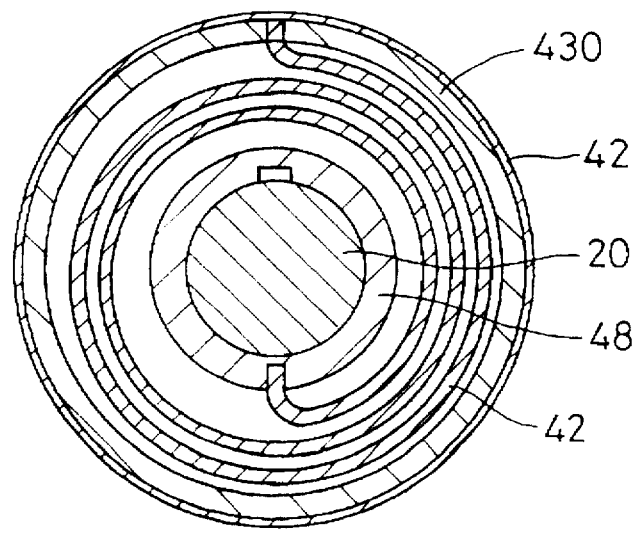
FIG. 22 is a view showing a spiral spring shown in FIG. 20.

As shown in FIG. 20, a rim 430 is formed integrally on the outer peripheral edge of the side ring 406, and this rim 430 surrounds a spiral spring 42. As shown in FIG. 22, the spiral spring 42 has its inner end fixed to an outside boss portion 48 of the inner sleeve 36 and its outer end fixed to the rim 430 of the side ring 406.

According to the variable valve timing device 400 of the fourth embodiment described above, the rotation of an engine or a camshaft 20 is transmitted from the bulging portion 402 of the inner sleeve 36 to the outer casing 404 or the cam robe 38 through the oil in the one liquid chamber 424. As this is done, the bulging portion 402 pressurizes the oil in the liquid chamber 424, whereby the oil in the liquid chamber 424 flows out into the liquid chamber 426 through the communication passage 428. In this case, the inner sleeve 36 and the cam robe 38 are allowed to relatively rotate with respect to each other. When the oil flows through the communication passage 428, the oil pressure in the hole 419 also increases, so that this oil pressure further presses the vane 420 against the inner peripheral surface of the intermediate ring 410, so that the vane 420 securely separates the liquid chambers 424 and 426.

Figure 23:
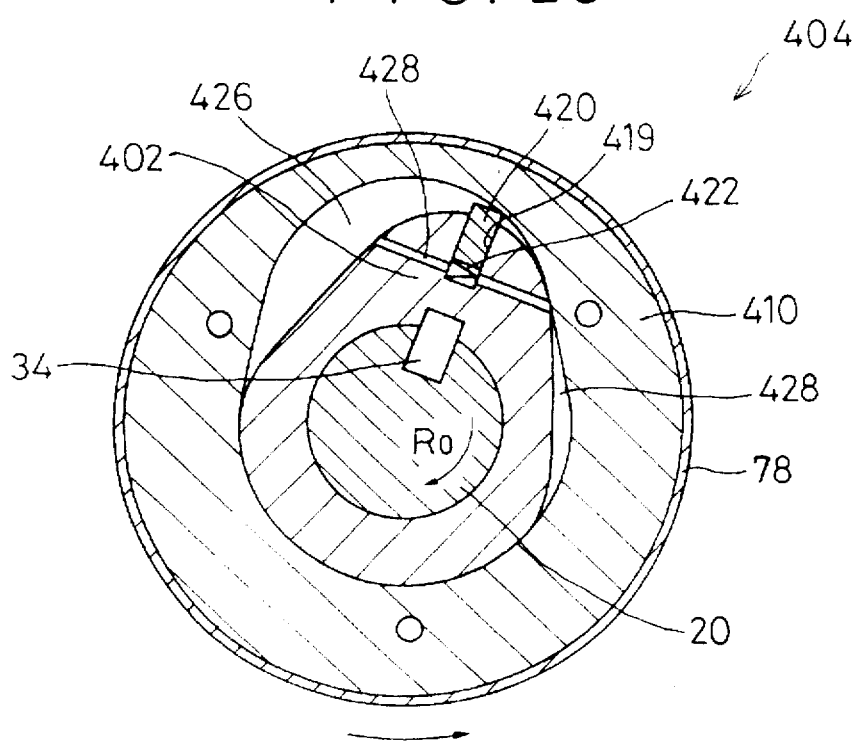
FIG. 23 is a cross-sectional view showing a state where a cam robe in the state of FIG. 21 is relatively rotated to a camshaft.

When a lift face 24b of the intake cam 24 depresses a roller 82 on a rocker arm 80 as the camshaft 20 rotates, the intake cam 24 is subjected to a reaction force from the rocker arm 80, based on the urging force of a valve spring 92. This reaction force acts so as to delay the rotation of the cam robe 38 or the intake cam 24 compared with the camshaft 20, as mentioned before. When the rotating speed of the camshaft 20 is in the low-speed rotation region, enough time is secured for the outflow of the oil from the liquid chamber 424 into the liquid chamber 426, and the bulging portion 402 of the inner sleeve 36 and the outer casing 404 relatively rotate to each other while subjecting the spiral spring 42 to elastic deformation, as shown in FIG. 23. As a result, the intake cam 24 rotates with a delay behind the camshaft 20, so that the valve opening timing of the intake valve 86 is delayed.

When the rotation of the camshaft 20 advances so that a return face 24d of the intake cam 24 reaches the roller 82 on the rocker arm 80, thereafter, the intake cam 24 is subjected to the restoring forces of the valve spring 92 and the spiral spring 42 in its rotating direction, as mentioned before. In this case, the rotation of the intake cam 24 consequently advances with respect to the camshaft 20 with the oil in the liquid chamber 426 flowing out into the liquid chamber 424. In the end, the state of FIG. 21 is restored from the state of FIG. 23, and the valve closing timing of the intake valve 86 is advanced.

When the rotating speed of the engine or the camshaft 20 increases from the low-speed rotation region, enough time cannot be secured for the delivery of the oil between the liquid chambers 424 and 426. As the rotating speed of the camshaft 20 increases, both the delay of the valve opening timing of the intake valve 86 and the advance of the valve closing timing are therefore reduced.

When the rotating speed of the camshaft 20 is in the high-speed rotation region, the camshaft 20 and the intake cam 24 rotate integrally with each other, and the valve opening and closing timings of the intake valve 86 are settled in accordance with the cam profile of the intake cam 24.

Figure 24:
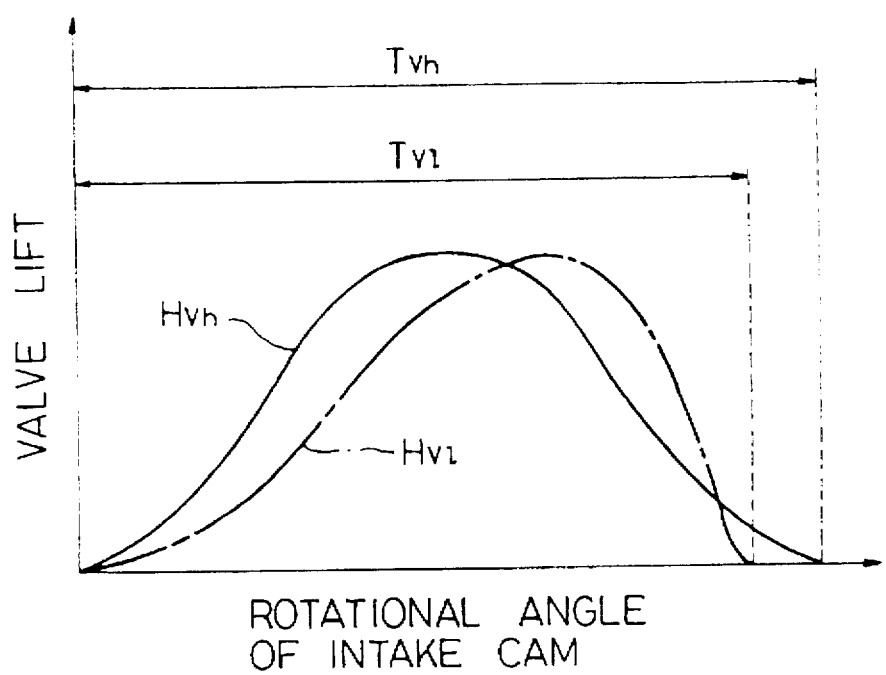
FIG. 24 is a graph showing valve lift characteristics of an intake valve based on the system of FIG. 20.

Thus, also in the case of the variable valve timing device 400 of the fourth embodiment, the valve-open period Tv1 of the intake valve 86 obtained when the rotating speed of the engine is in the low-speed rotation region is shorter than the valve-open period Tvh for the high-speed rotation region, as seen from the valve lift characteristics Hvl and Hvh in FIG. 24.

Figure 25:
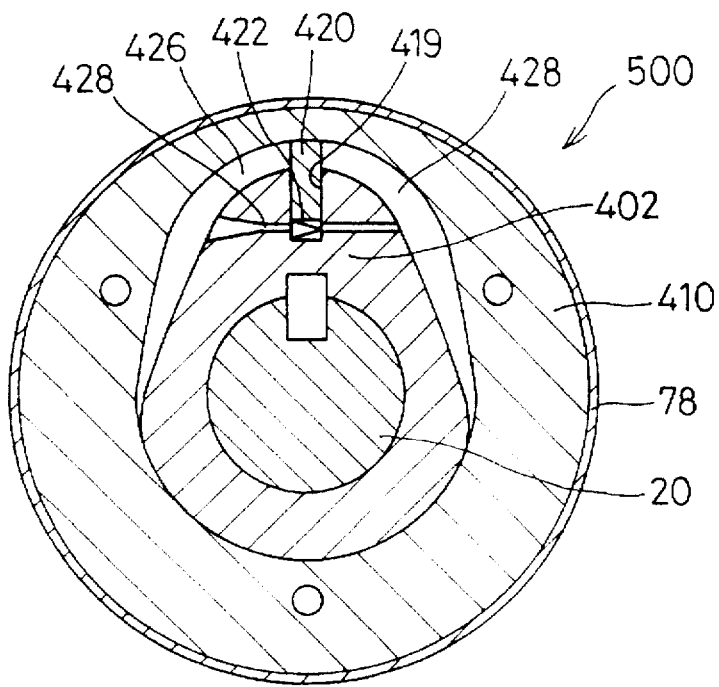
FIG. 25 is a cross-sectional view showing part of a valve drive system according to a fifth embodiment.
Figure 26:
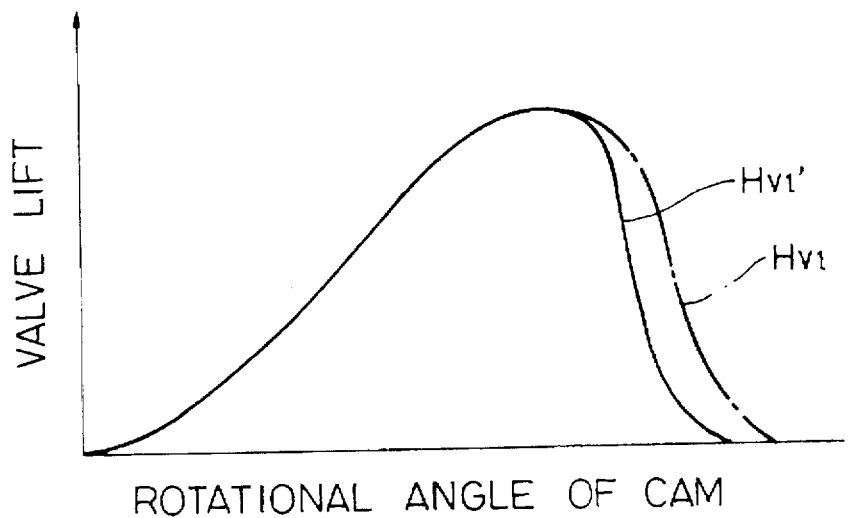
FIG. 26 is a graph showing valve lift characteristics of an intake valve based on the system of FIG. 25.
Figure 27:
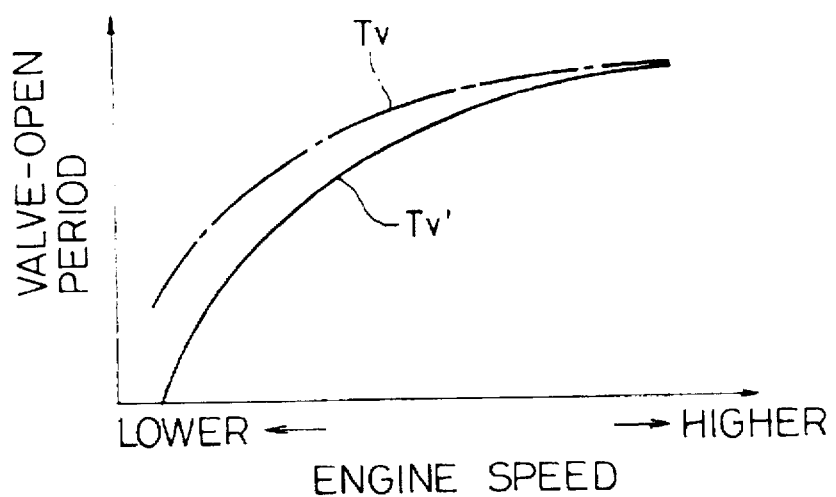
FIG. 27 is a graph showing the valve-open period of an intake valve compared with the engine speed in the system of FIG. 25.

Referring to FIG. 25, there is shown a variable valve timing device 500 according to a fifth embodiment which is applied to an intake valve 86. This device 500 differs from the device 400 of the fourth embodiment only in that the open end of a communication passage 428 on the side of a liquid chamber 426 is tapered. According to the device 500 of the fifth embodiment, the oil can flow out more easily from the liquid chamber 426 to a liquid chamber 424 than from the liquid chamber 424 to the liquid chamber 426. When the rotating speed of an engine is in the low-speed rotation region, therefore the valve closing timings of intake and exhaust valves are further advanced, as seen from a valve lift characteristic Hvl' in FIG. 26. In consequence, as shown in FIG. 27, a valve-open period Tv' for the case of the fifth embodiment, compared with a valve-open period Tv for the case of the fourth embodiment, is further shorter when the rotating speed of the engine is in the low-speed rotation region.

Figure 28:
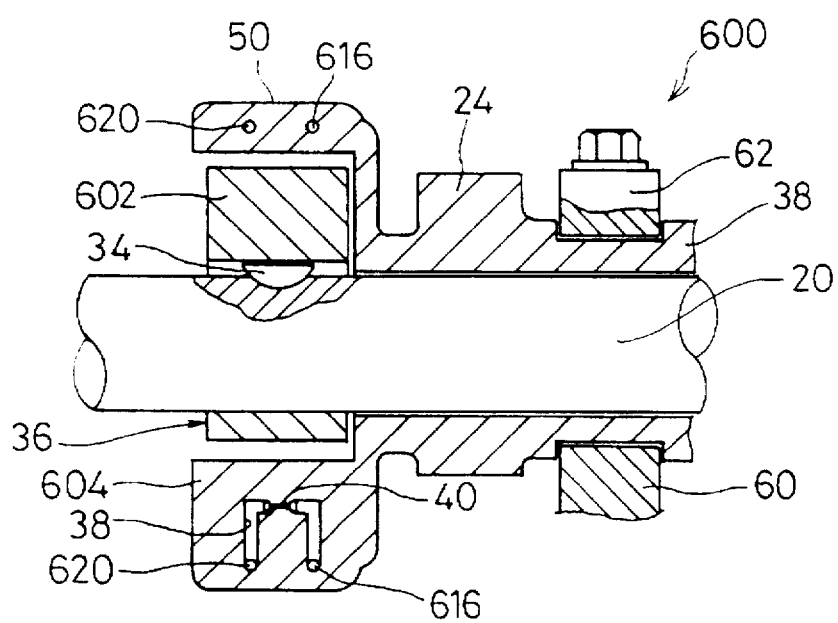
FIG. 28 is a sectional view showing part of a valve drive system according to a sixth embodiment.
Figure 29:
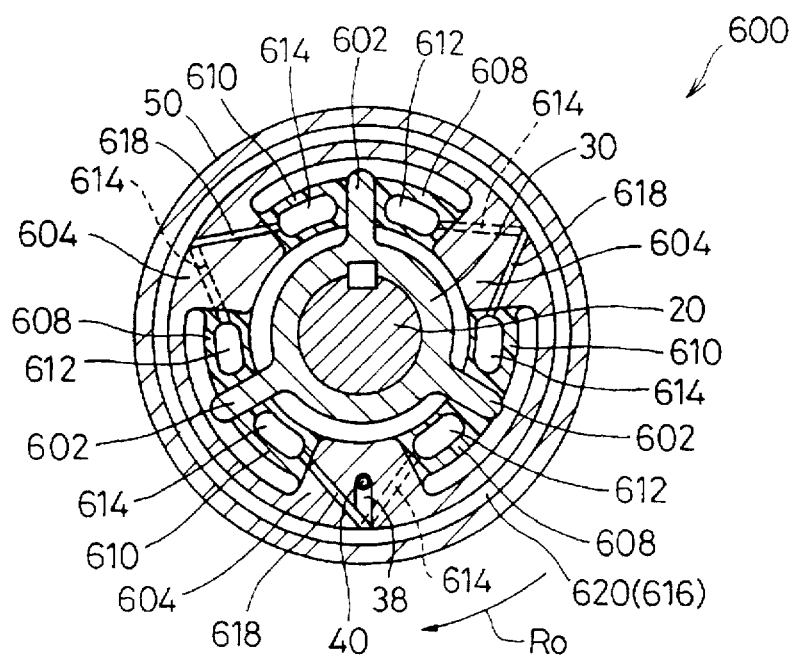
FIG. 29 is a cross-sectional view of the system of FIG. 28.

Referring to FIGS. 28 and 29, there is shown a variable valve timing device 600 according to a sixth embodiment which is applied to an intake valve 86. In the case of this device 600, an inner sleeve 36 is formed integrally with three first walls 602 on its outer peripheral surface, and these first walls 602 are arranged at regular intervals in the circumferential direction of the inner sleeve 36. Meanwhile, a large-diameter cylindrical portion 50 of a cam robe 38 is formed integrally with three second walls 604 on its inner peripheral surface. These second walls 604 are arranged at regular intervals in the circumferential direction of the large-diameter cylindrical portion 50, and are situated individually between the first walls 602. The first walls 602 and the second walls 604 are arranged alternately in the circumferential direction of a camshaft 20.

Each of the first walls 602 is connected to the second wall 604, which is situated on opposite sides with respect to the circumferential direction of the camshaft 20, by means of a front elastic member 608 and a rear elastic member 610. These elastic members 608 and 610 are hollow, and have liquid chambers 612 and 614 defined therein.

The liquid chamber 612 of the front elastic member 608 is connected to a collecting passage 616 by means of a passage 614 in the second wall 604. This collecting passage 616 is formed in the large-diameter cylindrical portion 50, and extends covering the whole circumference of the large-diameter cylindrical portion 50 in the circumferential direction thereof. The liquid chamber 614 of the rear elastic member 610 is connected to a collecting passage 620 by means of a passage 618 in the second wall 604. This collecting passage 620, like the collecting passage 616, is formed in the large-diameter cylindrical portion 50. As shown in FIG. 28, however, the collecting passages 616 and 620 are situated separately in the axial direction of the large-diameter cylindrical portion 50.

Figure 30:
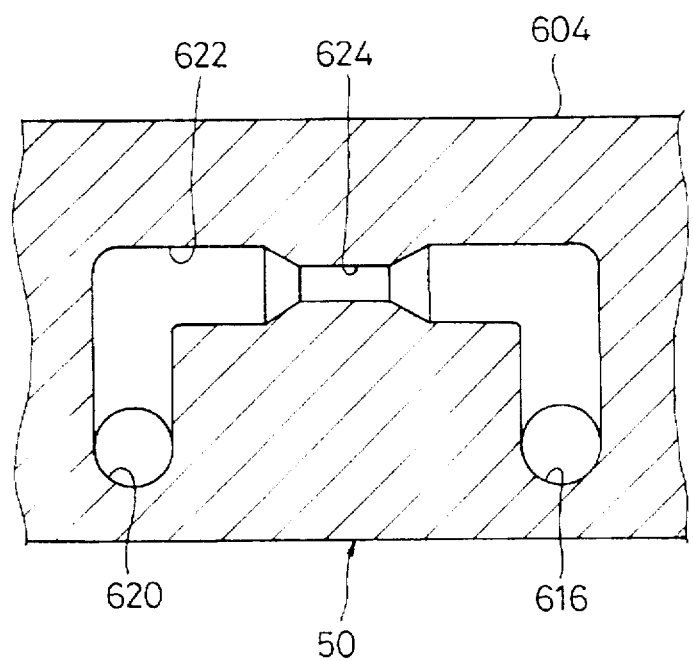
FIG. 30 is an enlarged view showing part of the system of FIG. 28.

As shown in FIG. 30, the collecting passages 616 and 620 are connected to each other by means of a communication passage 622 formed in one of the second walls 604, and an orifice 624 is formed in the middle of the communication passage 622. The liquid chambers 612 and 614 and the passages 614, 616, 618 and 620 are filled with oil.

According to the variable valve timing device 600 of the sixth embodiment, the rotatory force of the camshaft 20 is transmitted from the first walls 602 of the inner sleeve 36 to the second walls 604 of the large-diameter cylindrical portion 50 through the front elastic members 608, whereby the cam robe 38 or an intake cam 24 is rotated.

Thus, the liquid chamber 612 of the front elastic member 608 and the liquid chamber 614 of the rear elastic member 610 correspond to the liquid chambers 424 and 426 (see FIG. 21) of the device of the fourth embodiment, respectively. In consequence, the device 600 of the sixth embodiment, like the device 400 of the fourth embodiment, is arranged so that the valve opening timing and valve closing timing of the intake valve 86 is delayed and advanced, respectively, when the rotating speed of the engine is in the low-speed rotation region.

Figure 31:
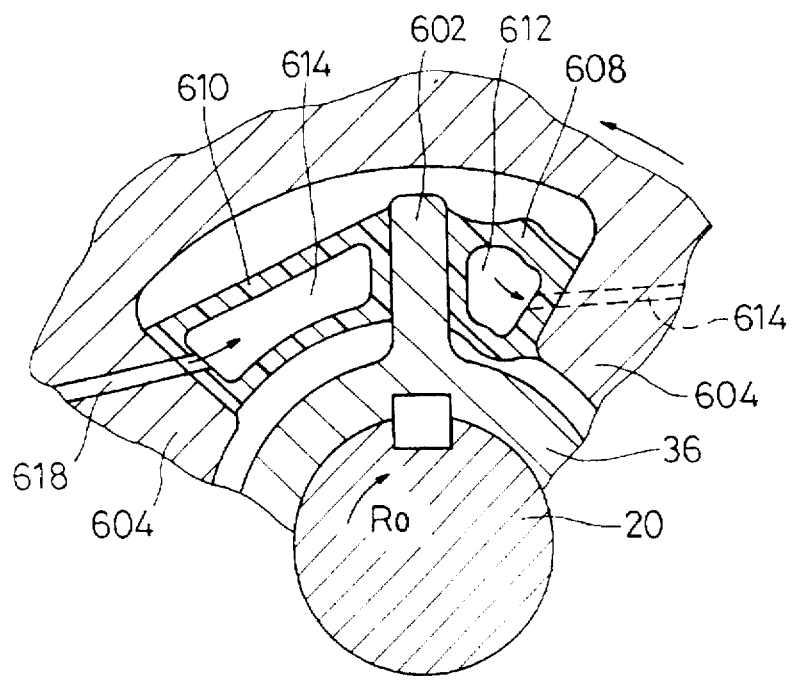
FIG. 31 is a cross-sectional view showing a state where a cam robe in the state of FIG. 29 is relatively rotated to a camshaft.

In this case, the delay of the valve opening timing is obtained by subjecting the front elastic members 608 to an elastic deformation such that their corresponding liquid chambers 612 are reduced in capacity and, on the other hand, subjecting the rear elastic members 610 to an elastic deformation such that their corresponding liquid chambers 614 are increased in capacity, as shown in FIG. 31, as the oil flows out from the liquid chambers 612 to the liquid chambers 614. In contrast with this, the advance of the valve closing timing is obtained when the state of FIG. 29 is restored from the state of FIG. 31 as the oil flows out from the liquid chambers 614 to the liquid chambers 612.

The delay of the valve opening timing and the advance of the valve closing timing can be adjusted by suitably setting the opening of the orifice 624 of the communication passage 622.

When the rotating speed of the engine is in the high-speed rotation region, on the other hand, the delivery of the oil between the liquid chambers 612 and 614 is prevented substantially, and the valve opening timing and valve closing timing of the intake valve 86 are settled individually in accordance with the cam profile of the intake cam 24. Thus, the device 600 of the sixth embodiment has the valve lift characteristics Hvl and Hvh shown in FIG. 24.

Figure 32:
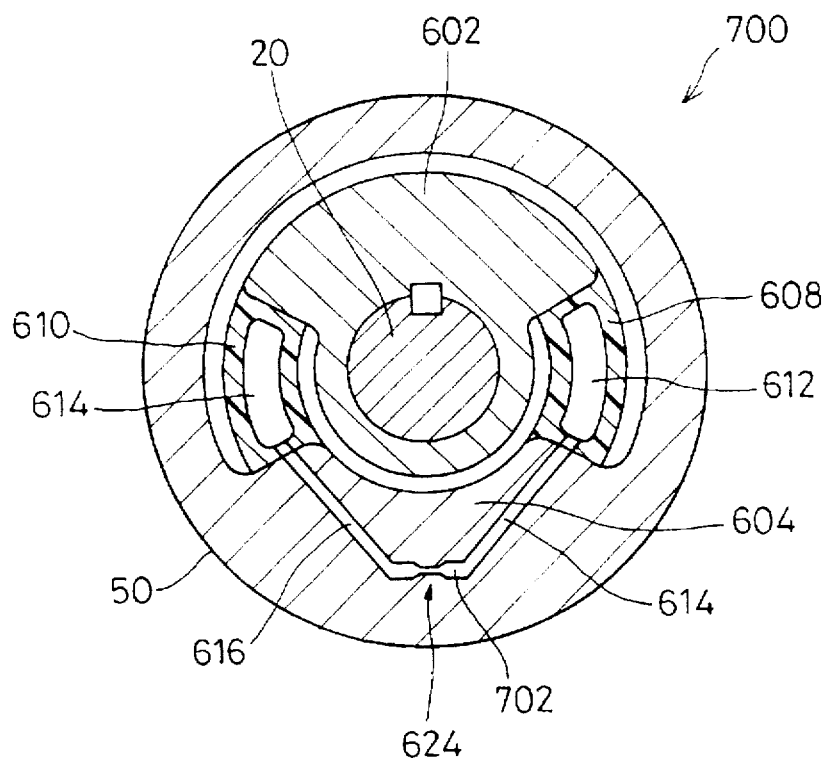
FIG. 32 is a cross-sectional view showing part of a valve drive system according to a seventh embodiment.

Referring to FIG. 32, there is shown a variable valve timing device 700 according to a seventh embodiment which is applied to an intake valve 86. In this device 700, an inner sleeve 36 and a large-diameter cylindrical portion 50 have one first wall 602 and one second wall 604 each, and these first and second walls 602 and 604 are connected to each other by means of one front elastic member 608 and one rear elastic member 610. In this case, a passage 614 extending from a liquid chamber 612 of the front elastic member 608 and a passage 616 extending from a liquid chamber 614 of the rear elastic member 610 are connected to each other by means of a communication passage 702, and this communication passage 702 is provided with an orifice 624.

Although the variable valve timing device 700 has a simpler construction than that of the device 600 of the sixth embodiment, the device 700 has the same function as the device 600.

Figure 33:
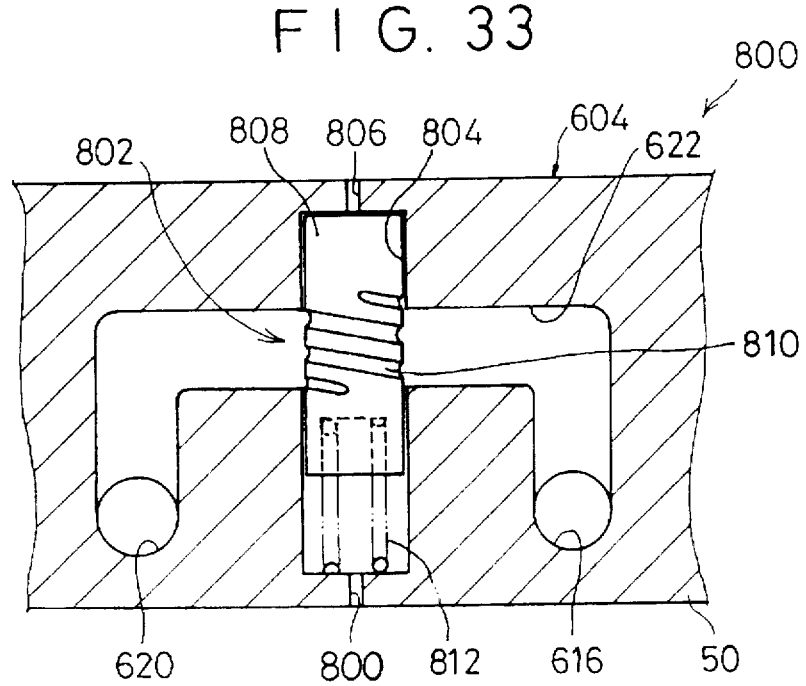
FIG. 33 is an enlarged view showing part of a valve drive system according to an eighth embodiment.

Referring to FIG. 33, there is shown part of a variable valve timing device 800 according to an eighth embodiment. This device 800 differs from the sixth embodiment in that the orifice 624 of the device 600 of the sixth embodiment is replaced with a variable orifice 802.

The variable orifice 802 is provided with a cylinder portion 804 which is formed in a second wall 604 of a large-diameter cylindrical portion 50, and this cylinder portion 804 extends in the diametrical direction of the large-diameter cylindrical portion 50 and intersects with a communication passage 622. Opposite ends of the cylinder portion 804 open in the outer peripheral surface of the large-diameter cylindrical portion 50 and the outer surface of the second wall 604 through a pair of vent holes 806, individually. A piston 808 is fitted in the cylinder portion 804, and a spiral groove 810 is formed on the outer peripheral surface of the piston 808. This spiral groove 810 is situated in the central portion of the piston 808 with respect to the axial direction thereof. A compression coil spring 812 is located between the outer end of the cylinder portion 804 and the piston 808. This compression coil spring 812 presses the piston 808 inward in the diametrical direction of the large-diameter cylindrical portion 50, thereby exposing the spiral groove 810 of the piston 808 to the communication passage 622.

Figure 34:
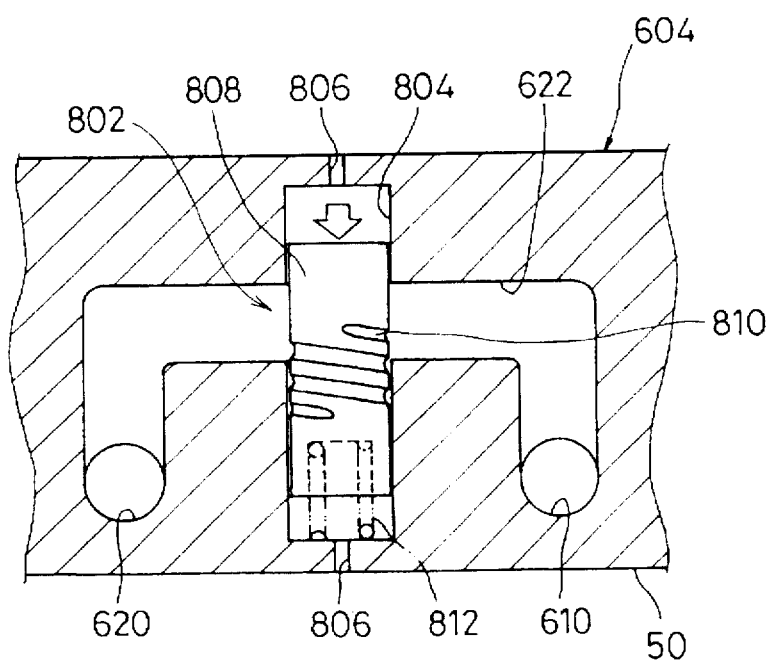
FIG. 34 is a view showing a state where a variable orifice of FIG. 33 is actuated.
Figure 35:
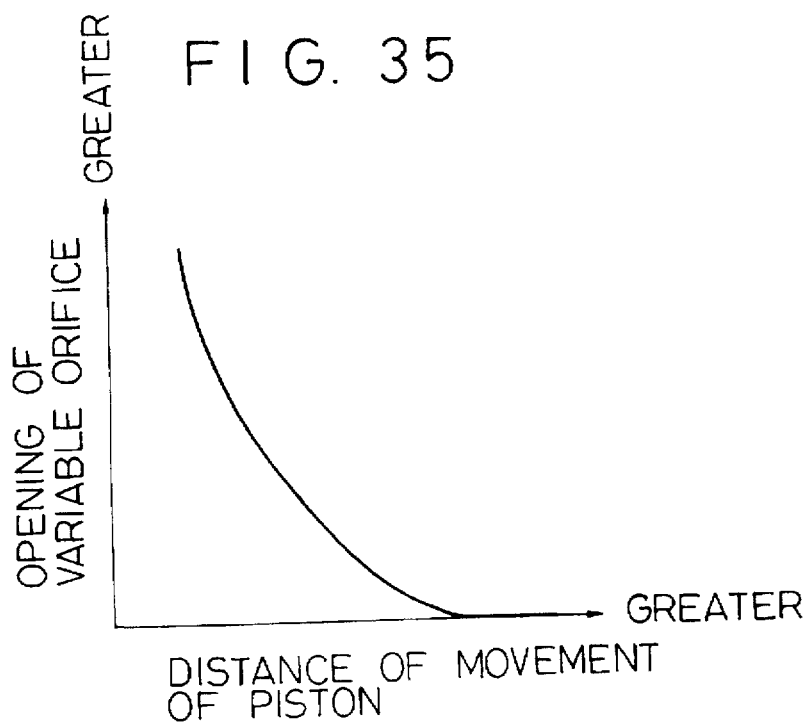
FIG. 35 is a graph showing the opening of the variable orifice compared with the distance of movement of a piston of FIG. 33.

According to the variable valve timing device 800 of the eighth embodiment, when the rotating speed of an engine or a camshaft 20 increases, the piston 808 is subjected to a centrifugal force, and moves toward the outer end of the cylinder portion 804, resisting against the urging force of the compression coil spring 812, as shown in FIG. 34. This movement of the piston 808 reduces the opening of the variable orifice 802 by a margin corresponding to the length of exposure of the spiral groove 810 to the communication passage 622, as shown in FIG. 35. Since the opening of the variable orifice 802 is reduced as the rotating speed of the camshaft 20 increases, the flow of oil between liquid chambers is consequently retarded, so that the delay of the valve opening timing of an intake valve 86 and the advance of the valve closing timing thereof are reduced individually.

Figure 36:
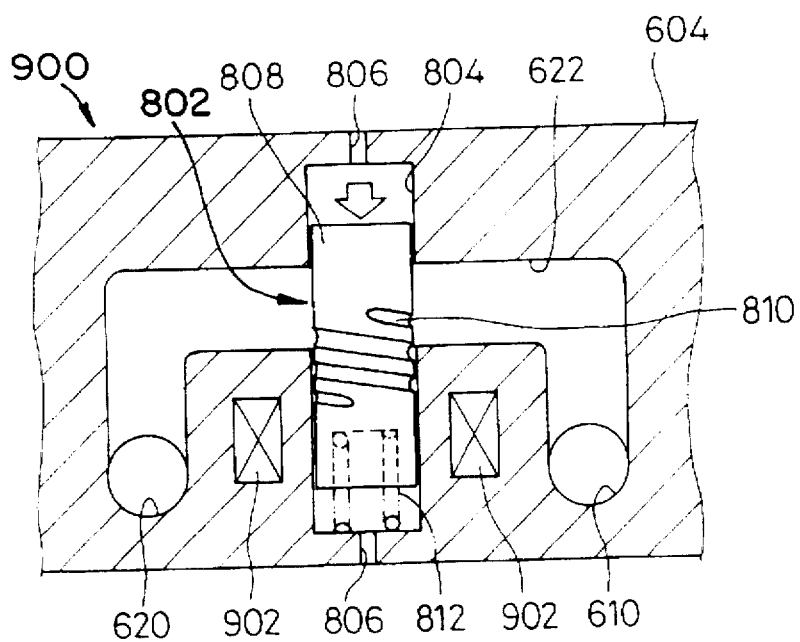
FIG. 36 is an enlarged sectional view showing part of a valve drive system according to a ninth embodiment.

Referring to FIG. 36, there is shown part of a variable valve timing device 900 according to a ninth embodiment. This device 900 is provided with a solenoid 902 for driving the piston 808 of the aforementioned variable orifice 802. This solenoid 902 can freely adjust the distance of movement of the piston 808, that is, the opening of the variable orifice 802.

Figure 37:
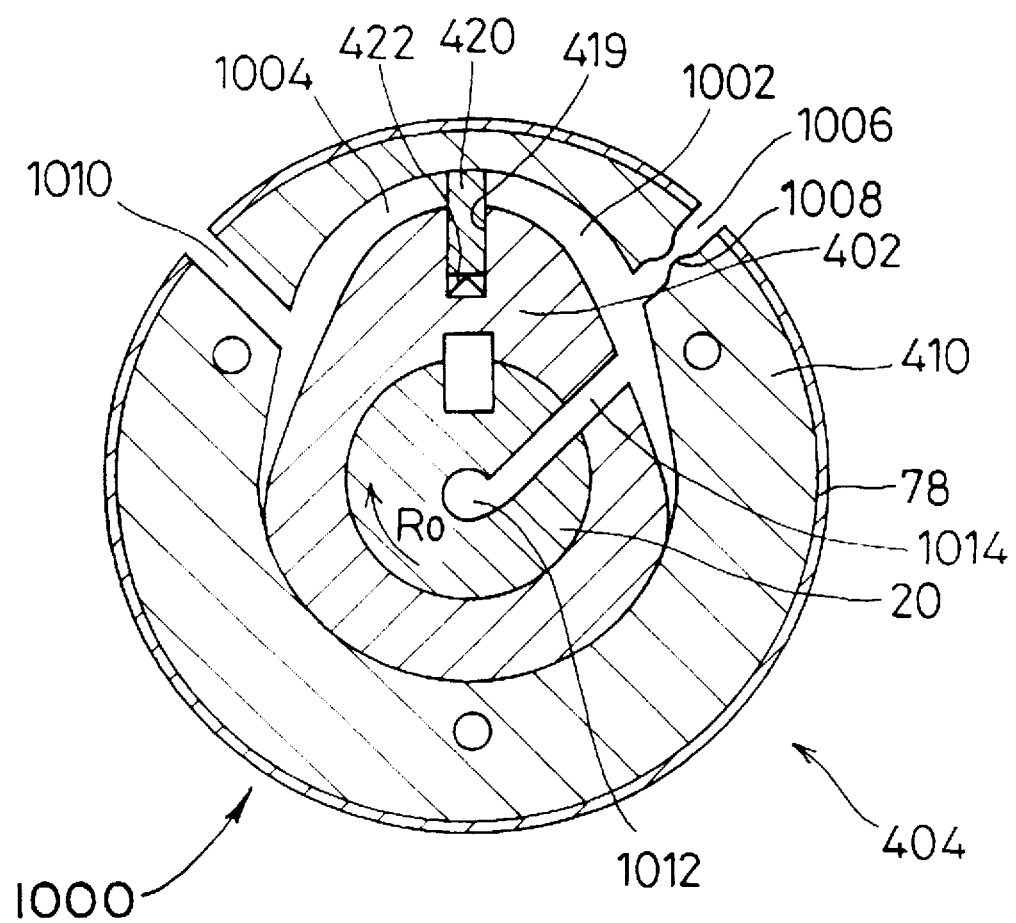
FIG. 37 is a cross-sectional view showing part of a valve drive system according to a tenth embodiment.

Referring to FIG. 37, there is shown a variable valve timing device 1000 according to a tenth embodiment which is applied to an intake valve 86. This device 1000, like the aforementioned device 400 of the fourth embodiment, is arranged so that a space between an intermediate ring 410 and a bulging portion 402 is divided into two chambers by means of a vane 420. One of the two chambers is formed as a liquid chamber 1002, and the other is formed as an atmosphere chamber 1004. Thus, in the case of the device 1000, the communication passage 428 connecting the liquid chambers 424 and 426 is not necessary.

The liquid chamber 1002 opens to the outside of an outer casing 404 through a passage 1006 which is formed in the intermediate ring 410 and a cover 78, and an orifice 1008 is formed in the middle of the passage 1006. This orifice 1008 may be replaced with the aforementioned variable orifice. On the other hand, the atmosphere chamber 1004 opens to the outside of the outer casing 404 through a passage 1010 which is formed in the intermediate ring 410 and the cover 78.

Moreover, an axial passage 1012 is formed in a camshaft 20, and this axial passage 1012 is connected to the liquid chamber 1002 through a passage 1014 which is formed in the camshaft 20 and the bulging portion 402. Also, the axial passage 1012 is connected to an oil supply passage (not shown), and this supply passage serves continually to feed oil into the liquid chamber 1002 through the axial passage 1012.

Although the device 1000 of the tenth embodiment, unlike the foregoing embodiments, has only one liquid chamber, it can fulfill the same function as the device 400 of the fourth embodiment.

We claim:

1. A valve drive system of an internal combustion engine, comprising:

a first rotating member which rotates in association with a crankshaft of the internal combustion engine;

a second rotating member rotatable relatively to the first rotating member;

a cam provided on said second rotating member and rotating integrally with the second rotating member, thereby opening and closing a valve of said internal combustion engine, in cooperation with a valve spring; and a connecting unit which connects said first rotating member and said second rotating member while permitting a relative rotation therebetween, said connection unit having a transmission unit which transmits the rotary force of said first rotating member to said second rotating member, and a varying unit which changes a rotation speed of said second rotating member with respect to said first rotating member in conjunction with a restoring force of said valve spring in accordance with an operational state of said internal combustion engine to determine a time of termination of said valve opening with respect to the rotational phase of said crankshaft, said connecting unit including a fluid coupling connecting said first and second rotating members, said fluid coupling including, a fluid chamber defined between said first and second rotating members, said fluid chamber having a viscous fluid sealed therein, a first plate located in said fluid chamber and fixed to said first rotating member, and a second plate located opposite said first plate in said fluid chamber and fixed to said second rotating member.

2. A valve drive system of an internal combustion engine according to claim 1, wherein said fluid coupling changes a time of termination of a cam lift in accordance with the rotating speed of said internal combustion engine.

3. A valve drive system of an internal combustion engine according to claim 2, wherein said second rotating member has a hollow section which surrounds said first rotating member.

4. A valve drive system of an internal combustion engine according to claim 3, wherein said internal combustion engine includes a plurality of cylinders, and said first rotating member being common to all of said plurality of cylinders and said second rotating member being provided for each of said cylinders.

5. A valve drive system of an internal combustion engine according to claim 2, wherein said connecting unit further includes a pusher portion provided in said first rotating member and a receiving portion provided in said second rotating member, said receiving portion engages said pusher portion in a process of opening said valve.

6. A valve drive system of an internal combustion engine according to claim 5, wherein said connecting means further includes urging means for urging said first and second rotating members in a rotating direction such that said pusher portion abuts against said receiving portion.

7. A valve drive system of an internal combustion engine according to claim 1, wherein said connecting unit decreases opening speed of said valve.

8. A valve drive system of an internal combustion engine according to claim 1, wherein said connecting unit increases closing speed of said valve.

9. A valve drive system of an internal combustion engine according to claim 2, wherein said fluid coupling transmits the rotary force of said first rotating member to said second rotating member in a process of opening said valve.

10. A valve drive system of an internal combustion engine according to claim 9, wherein said connecting unit further includes urging means for urging said second rotating member toward said first rotating member, the urging means maintains a constant rotational angle position of said second rotating member with respect to said first rotating member when said first rotating member and second rotating member rotate integrally with each other.

11. A valve drive system of an internal combustion engine according to claim 10, wherein said connecting means further includes limiting means for limiting the allowable range of relative rotation between said first and second rotating members.

12. A valve drive system of an internal combustion engine according to claim 10, wherein the urging means has a spiral spring.

13. A valve drive system of an internal combustion engine according to claim 9, wherein said second rotating member includes a first portion fitted on said first rotating member and a second portion having a diameter larger than the diameter of the first portion, the second portion constituting part of a casing which defines said fluid chamber.

14. A valve drive system of an internal combustion engine according to claim 13, wherein said connecting unit includes a pusher portion provided in said first rotating member and a receiving portion provided in said second rotating member, said receiving portion engages said pusher portion in a process of opening said valve, said second portion being formed on one end of said second rotating member and said receiving portion formed on the other end portion of said second rotating member.

* * * * *